(12) United States Patent
Gooden et al.

(10) Patent No.: US 11,658,836 B2
(45) Date of Patent: May 23, 2023

(54) TECHNOLOGIES FOR PRESERVING CONTEXTUAL DATA ACROSS VIDEO CONFERENCES

(71) Applicant: Handzin, Inc., San Francisco, CA (US)

(72) Inventors: Henry James Gooden, Unley (AU); Michael John Galvin, San Francisco, CA (US); Brian Mcgill Isaac, San Francisco, CA (US)

(73) Assignee: Handzin, Inc., San Francisco, CA (US)

( * ) Notice: Subject to any disclaimer, the term of this patent is extended or adjusted under 35 U.S.C. 154(b) by 0 days.

(21) Appl. No.: 17/541,339

(22) Filed: Dec. 3, 2021

(65) Prior Publication Data
US 2022/0182252 A1    Jun. 9, 2022

Related U.S. Application Data

(60) Provisional application No. 63/123,030, filed on Dec. 9, 2020.

(51) Int. Cl.
*G06F 15/16* (2006.01)
*H04L 12/18* (2006.01)
*G06F 3/0482* (2013.01)

(52) U.S. Cl.
CPC ........ *H04L 12/1831* (2013.01); *G06F 3/0482* (2013.01); *H04L 12/1822* (2013.01)

(58) Field of Classification Search
None
See application file for complete search history.

(56) References Cited

U.S. PATENT DOCUMENTS

| | | | |
|---|---|---|---|
| 6,330,022 B1 | 12/2001 | Seligmann | |
| 7,466,334 B1 | 12/2008 | Baba | |
| 9,412,088 B2 | 8/2016 | Gandhi et al. | |
| 9,762,404 B2 | 9/2017 | Ramano | |
| 10,200,206 B2 | 2/2019 | Wallbaum et al. | |
| 10,320,723 B2 | 6/2019 | Rideout et al. | |
| 10,659,729 B2 | 5/2020 | Pell | |
| 11,463,576 B1 * | 10/2022 | Gordon ................... G06F 21/32 |

(Continued)

FOREIGN PATENT DOCUMENTS

| | | | | |
|---|---|---|---|---|
| JP | 2006146415 A | 6/2006 | | |
| WO | WO-2015164521 A1 * | 10/2015 | ............. | G06F 21/10 |

OTHER PUBLICATIONS

©Sametime® Limited Use 10, IBM, May 2019, IBM, Edition 10, pp. 1-2 (Year: 2019).*

*Primary Examiner* — Phyllis A Book
(74) *Attorney, Agent, or Firm* — Barnes & Thornburg LLP

(57) ABSTRACT

Technologies for preserving contextual data across video conferences include a compute device. The compute device includes circuitry configured to provide a graphical user interface that enables authenticated and approved users to hold a first video conference and share contextual data among the users in association with the first video conference. The circuitry is also configured to store a record of the contextual data shared among the authenticated and approved users. Additionally, the circuitry is configured to provide, in the graphical user interface and in association with a subsequent video conference among the users, the record of the contextual data that was shared among the users in association with the first video conference. The contextual data includes at least one of a textual communication and a file.

16 Claims, 22 Drawing Sheets

(56) References Cited

U.S. PATENT DOCUMENTS

| | | | | |
|---|---|---|---|---|
| 2011/0271201 A1* | 11/2011 | Cavagnari | .............. | G06Q 10/10 |
| | | | | 715/835 |
| 2012/0069131 A1* | 3/2012 | Abelow | ............. | G06Q 30/0601 |
| | | | | 345/589 |
| 2013/0318589 A1* | 11/2013 | Ford | ....................... | H04L 63/10 |
| | | | | 726/7 |
| 2014/0337733 A1* | 11/2014 | Rodriguez | ................ | G06F 9/50 |
| | | | | 715/718 |
| 2015/0149929 A1* | 5/2015 | Shepherd | .............. | H04L 65/403 |
| | | | | 715/753 |
| 2018/0032997 A1* | 2/2018 | Gordon | .............. | G06Q 30/0269 |
| 2018/0367506 A1* | 12/2018 | Ford | ................... | H04L 63/0421 |
| 2019/0065011 A1* | 2/2019 | Room | ....................... | G06F 8/38 |
| 2019/0155870 A1* | 5/2019 | Prakash | ................ | G06F 40/103 |
| 2021/0026415 A1* | 1/2021 | Zenoff | ................... | G06F 1/1635 |
| 2021/0110414 A1* | 4/2021 | Faulkner | ................ | G06N 20/00 |
| 2022/0006661 A1* | 1/2022 | Rathod | .............. | H04L 12/1818 |
| 2022/0150083 A1* | 5/2022 | Faulkner | ................ | H04N 7/152 |

* cited by examiner

FIG. 14

TECHNOLOGIES FOR PRESERVING CONTEXTUAL DATA ACROSS VIDEO CONFERENCES

CROSS-REFERENCE TO RELATED APPLICATIONS

The present application claims the benefit of U.S. Provisional Patent Application No. 63/123,030, filed Dec. 9, 2020.

BACKGROUND

Computer network based collaboration systems provide advantages over in-person networking events and meetings. For example, such systems eliminate the time and expense involved in travelling to a physical destination to meet with other people. Further, systems that support video conferencing enable participants to convey, in real time, visual information (e.g., facial expressions, shared computer screens, etc.) that may otherwise be unavailable through other methods of networked communication (e.g., text only, audio only, etc.).

In many scenarios, participants may meet over the course of multiple video conferences, such as to discuss the present status of a project and to discuss further developments related to the project. As such, information exchanged between participants in one video conference may be relevant to a subsequent video conference between those participants. However, in known systems, any such data exchanged in association with one video conference is not readily available to be accessed by the participants in a subsequent video conference. As a result, significant time may be wasted in locating data necessary to continue the discussion of a topic that was the subject of a previous video conference.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements. The detailed description particularly refers to the accompanying figures in which:

FIGS. 7-22 are embodiments of user interfaces that may be produced by the system of FIG. 1.

DETAILED DESCRIPTION OF THE DRAWINGS

Figure 1:
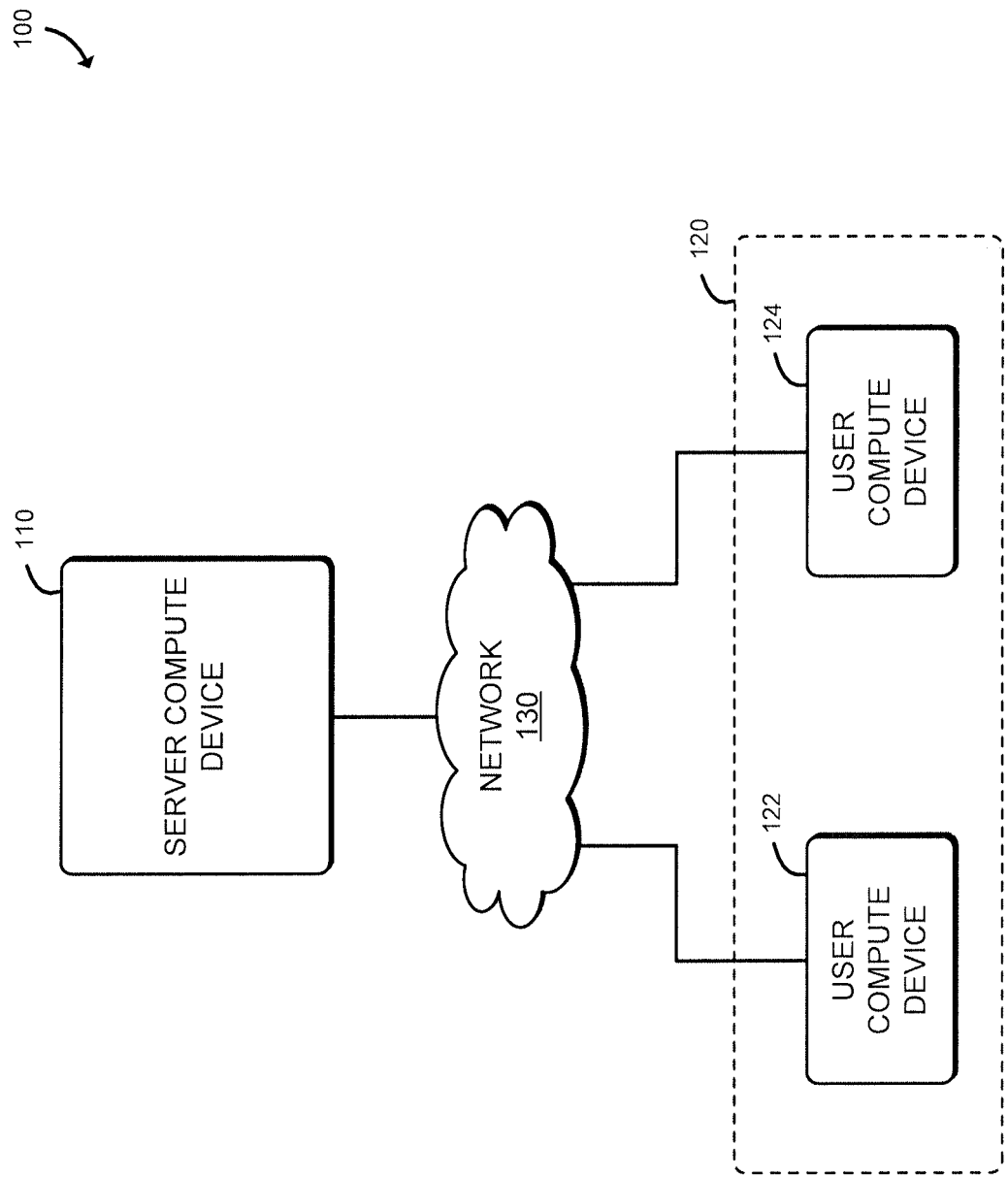
FIG. 1 is a simplified block diagram of at least one embodiment of a system for efficiently presenting data to users for computer network based collaborations.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on a transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Referring now to FIG. 1, a system 100 for efficiently presenting data to users for computer network based collaborations includes, in the illustrative embodiment, a server compute device 110 (e.g., a rack-mounted server, a blade server, a desktop computer, etc.) in communication with user compute devices 120 (e.g., each a desktop computer, laptop computer, tablet computer, notebook, netbook, cellular phone, smartphone, personal digital assistant, mobile Internet device, wearable computing device, hybrid device, and/or any other compute/communication device). While only two user compute devices 122, 124 are shown in FIG. 1, it should be understood that, in practice, the number of user compute devices 120 may differ (e.g., tens, hundreds, thousands, or more user compute devices 120). Similarly, while only one server compute device 110 is shown in FIG. 1 for clarity of illustration, in some embodiments the system 100 may include multiple server compute devices and/or may include virtualized components of one or more compute devices (e.g., in a cloud data center) communicatively coupled to operate as the server compute device 110. In operation, the system 100 provides a platform, implemented through the server compute device 110 (e.g., executing computer-readable instructions (e.g., code) at the server compute device 110) and the user compute devices 120 (e.g., executing code at the user compute devices 120, such as JavaScript and/or hyper-text markup language (HTML) in a web browser interface, interpreted or compiled code in a native software application, etc.) that enables users to collaborate (e.g., using video conferences, discussion threads, file sharing, and messages).

During video conferences, contextual data, such as textual communications and/or files that are shared between participants in association with a video conference are not lost after the video conference ends. Rather, the system 100 preserves the contextual data that was shared among users in association with a video conference and presents those textual communications and/or files again when the users have a subsequent video conference. As such, unlike typical video conference systems, the system 100 enables more efficient access to data (e.g., contextual data) that may be needed by the participants to resume a discussion of a topic in a subsequent video conference.

Additionally, in some embodiments, the system 100 provides a user interface that allows users to navigate through other content on the platform while participating in a video conference, by splitting the user interface into one subsection associated with the video conference and another subsection for navigating through content. As such, users may quickly reference information available on the platform for reference within an ongoing video conference. Furthermore, in at least some embodiments, the system 100 presents, in a dashboard (e.g., a graphical user interface containing a report or at-a-glance view of one or more categories of data), discussion threads, files, and people associated with a corresponding level of the dashboard. The level of the dashboard may be selectively set to all of the organizations that the user belongs to, a level that corresponds to a selected organization that the user belongs to, a level that corresponds to a selected community within the selected organization, a level that corresponds to a selected discussion thread within a selected community, or a level that corresponds to a specific video conference that may include users from several organizations. As such, the system 100 enables a user to efficiently access information of interest on the platform, rather than requiring the user to sort through information that is not germane to a particular organization, community, or discussion that the user is contributing to at a given time.

Figure 2:
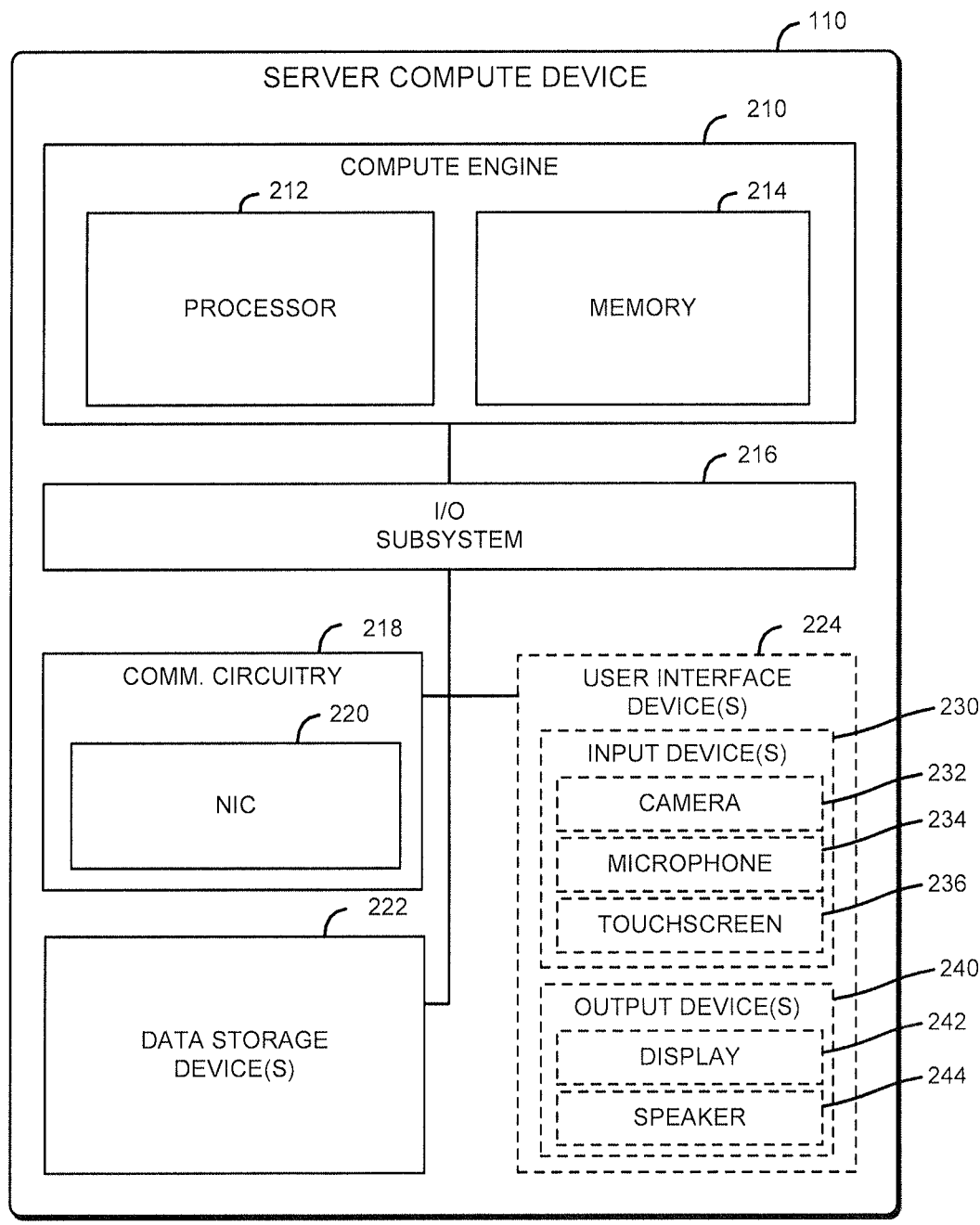
FIG. 2 is a simplified block diagram of at least one embodiment of a compute device of the system of FIG. 1.

Referring now to FIG. 2, the illustrative server compute device 110 includes a compute engine 210, an input/output (I/O) subsystem 216, communication circuitry 218, and data storage subsystem 222. In some embodiments, the server compute device 110 may additionally include one or more user interface devices 224. Of course, in other embodiments, the server compute device 110 may include other or additional components. Additionally, in some embodiments, one or more of the illustrative components may be incorporated in, or otherwise form a portion of, another component.

The compute engine 210 may be embodied as any type of device or collection of devices capable of performing various compute functions described below. In some embodiments, the compute engine 210 may be embodied as a single device such as an integrated circuit, an embedded system, a field-programmable gate array (FPGA), a system-on-a-chip (SOC), or other integrated system or device. Additionally, in the illustrative embodiment, the compute engine 210 includes or is embodied as a processor 212 and a memory 214. The processor 212 may be embodied as any type of processor capable of performing the functions described herein. For example, the processor 212 may be embodied as a single or multi-core processor(s), a microcontroller, or other processor or processing/controlling circuit. In some embodiments, the processor 212 may be embodied as, include, or be coupled to an FPGA, an application specific integrated circuit (ASIC), reconfigurable hardware or hardware circuitry, or other specialized hardware to facilitate performance of the functions described herein.

The main memory 214 may be embodied as any type of volatile (e.g., dynamic random access memory (DRAM), etc.) or non-volatile memory or data storage capable of performing the functions described herein. Volatile memory may be a storage medium that requires power to maintain the state of data stored by the medium. In some embodiments, all or a portion of the main memory 214 may be integrated into the processor 212. In operation, the main memory 214 may store various software and data used during operation such as accounts of users of the system 100, data identifying organizations, communities within organization, conversation threads, and data shared in association with any of the organizations, communities, and conversation threads, applications, libraries, and drivers.

The compute engine 210 is communicatively coupled to other components of the server compute device 110 via the I/O subsystem 216, which may be embodied as circuitry and/or components to facilitate input/output operations with the compute engine 210 (e.g., with the processor 212 and the main memory 214) and other components of the server compute device 110. For example, the I/O subsystem 216 may be embodied as, or otherwise include, memory controller hubs, input/output control hubs, integrated sensor hubs, firmware devices, communication links (e.g., point-to-point links, bus links, wires, cables, light guides, printed circuit board traces, etc.), and/or other components and subsystems to facilitate the input/output operations. In some embodiments, the I/O subsystem 216 may form a portion of a system-on-a-chip (SoC) and be incorporated, along with one or more of the processor 212, the main memory 214, and other components of the server compute device 110, into the compute engine 210.

The communication circuitry 218 may be embodied as any communication circuit, device, or collection thereof, capable of enabling communications over a network between the server compute device 110 and another device (e.g., the user compute devices 122, 124, etc.). The communication circuitry 218 may be configured to use any one or more communication technology (e.g., wired or wireless communications) and associated protocols (e.g., Ethernet, Wi-Fi®, WiMAX, Bluetooth®, etc.) to effect such communication.

The illustrative communication circuitry 218 includes a network interface Controller (NIC) 220, The NIC 220 may be embodied as one or more add-in-boards, daughter cards, network interface cards, controller chips, chipsets, or other devices that may be used by the server compute device 110 to connect with another compute device (e.g., the user compute devices 122, 124, etc.). In some embodiments, the NIC 220 may be embodied as part of a system-on-a-chip (SoC) that includes one or more processors, or included on a multichip package that also contains one or more processors. In some embodiments, the NIC 220 may include a local processor (not shown) and/or a local memory (not shown) that are both local to the NIC 220. In such embodiments, the local processor of the NIC 220 may be capable of performing one or more of the functions of the compute engine 210 described herein. Additionally or alternatively, in such embodiments, the local memory of the NIC 220 may be integrated into one or more components of the server compute device 110 at the board level, socket level, chip level, and/or other levels.

Each data storage device 222, may be embodied as any type of device configured for short-term or long-term storage of data such as, for example, memory devices and circuits, memory cards, hard disk drives, solid-state drives, or other data storage device. Each data storage device 222 may include a system partition that stores data and firmware code for the data storage device 222 and one or more operating system partitions that store data files and executables for operating systems.

In some embodiments, the server compute device 110 includes one or more user interface devices 224, such as one or more input devices 230 and/or one or more output devices 240. As non-limiting examples, the one or more input devices 230 may include a camera 232 (e.g., a charge coupled device (CCD) or complementary metal-oxide-semiconductor (CMOS) image sensor coupled with a lens to focus received light and a shutter to control the amount of light received by the image sensor and circuitry to convert the received light to pixel data defining intensities of component colors for each spatial location in an image or a series of images), a microphone 234 (e.g., any device configured to convert acoustic waves to electrical signals), and/or a touchscreen 236 (e.g., any suitable touchscreen input technology to detect the user's tactile selection of information displayed on a display including, but not limited to, resistive touchscreen sensors, capacitive touchscreen sensors, surface acoustic wave (SAW) touchscreen sensors, infrared touchscreen sensors, optical imaging touchscreen sensors, acoustic touchscreen sensors, and/or other type of touchscreen sensors). The one or more output devices 240 may include, a display 242 (e.g.; any suitable display technology including, for example; a liquid crystal display (LCD), a light emitting diode (LED) display, a cathode ray tube (CRT) display, a plasma display, and/or other display usable in a compute device), which may be integrated with the touchscreen 236 in some embodiments, and/or a speaker 244 (e.g., any device configured to convert electrical signals defining a waveform to corresponding acoustic waves).

While shown as a single unit, it should be appreciated that the components of the server compute device 110 may, in some embodiments, be distributed across multiple physical locations (e.g., multiple racks in a data center). Further, one or more of the components may be virtualized (e.g., in a virtual machine executing on one or more physical compute devices).

The user compute devices 120 may have components similar to those described in FIG. 2 with reference to the server compute device 110. The description of those components of the server compute device 110 is equally applicable to the description of components of the user compute devices 120. Further, it should be appreciated that any of the devices 110 and 120 may include other components, sub-components, and devices commonly found in a computing device, which are not discussed above in reference to the server compute device 110 and not discussed herein for clarity of the description.

In the illustrative embodiment, the server compute device 110 and the user compute devices 120 are in communication via a network 130, which may be embodied as any type of wired or wireless communication network, including global networks (e.g., the internet), local area networks (LANs) or wide area networks (WANs), digital subscriber line (DSL) networks, cable networks (e.g., coaxial networks, fiber networks, etc.), cellular networks (e.g., Global System for Mobile Communications (GSM), Long Term Evolution (LTE), Worldwide Interoperability for Microwave Access (WiMAX), 3G, 4G, 5G, etc.), a radio area network (RAN), or any combination thereof.

Figure 3:
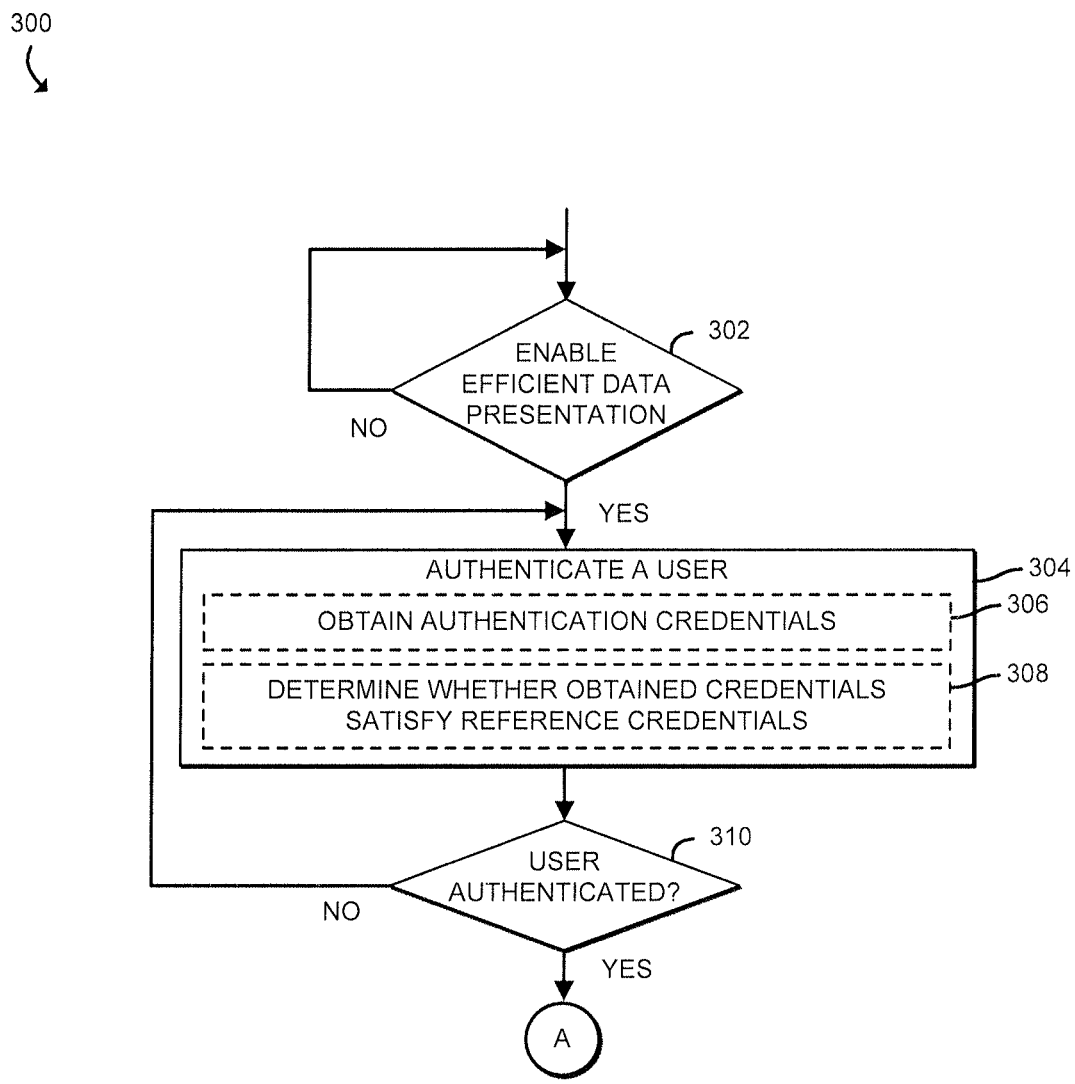
FIGS. 3-6 are simplified block diagrams of at least one embodiment of a method for providing efficient data presentation that may be performed by the system of FIG. 1.

Referring now to FIG. 3, the system 100, in the illustrative embodiment, may perform a method 300 for providing efficient data presentation. The method 300 is described herein as being performed by the server compute device 110. However, it should be understood that it is within the scope of the disclosure that one or more of the user compute devices 120 may execute at least a portion of the method 300 (e.g., by executing code at the user compute device 120 to display a user interface according to data sent from the server compute device 110, to enable a camera and microphone to receive video and audio from a user of a corresponding user compute device 120, to receive other input from a user, etc.). The method 300 begins with block 302, in which the server compute device 110 may determine whether to enable efficient data presentation. In the illustrative embodiment, the server compute device 110 may determine to enable efficient data presentation in response to determining that a configuration setting (e.g., in a configuration file in the data storage 222) indicates to enable efficient data presentation, in response to a request from another compute device (e.g., a user compute device 120) to do so, and/or based on other factors.

Regardless, in response to a determination to enable efficient data presentation, the method 300 advances to block 304, in which the server compute device 110 authenticates a user (e.g., a user of a user compute device 120). In doing so, and as indicated in block 306, the server compute device 110 may obtain authentication credentials (e.g., a username, a password, a personal identification number (PIN), biometric data, etc. from the corresponding user compute device 120). Further, and as indicated in block 308, the server compute device 110, in the illustrative embodiment, determines whether the obtained credentials (e.g., from block 306) satisfy (e.g., match) reference credentials (e.g., authentication credentials associated with a user account in the data storage 222). In block 310, the server compute device 110 determines a subsequent course of action as a function of whether the user was authenticated in block 304. If not, the method 300, in the illustrative embodiment, loops back to block 304 to again authenticate a user (e.g., display a message indicating that the authentication attempt failed and again obtain authentication credentials to be compared to reference credentials). However, if the authentication was successful, the method 300 advances to block 312 of FIG. 4, in which the server compute device 110 provides a graphical user interface to the user (e.g., to the user compute device 120 of the user who successfully authenticated in block 302 of FIG. 3). In the illustrative embodiment, the server compute device 110 sends, to the corresponding user compute device 110, computer renderable code (e.g., HTML, JavaScript, etc.) and corresponding data that defines the user interface to be displayed on the user compute device 120.

Figure 4:
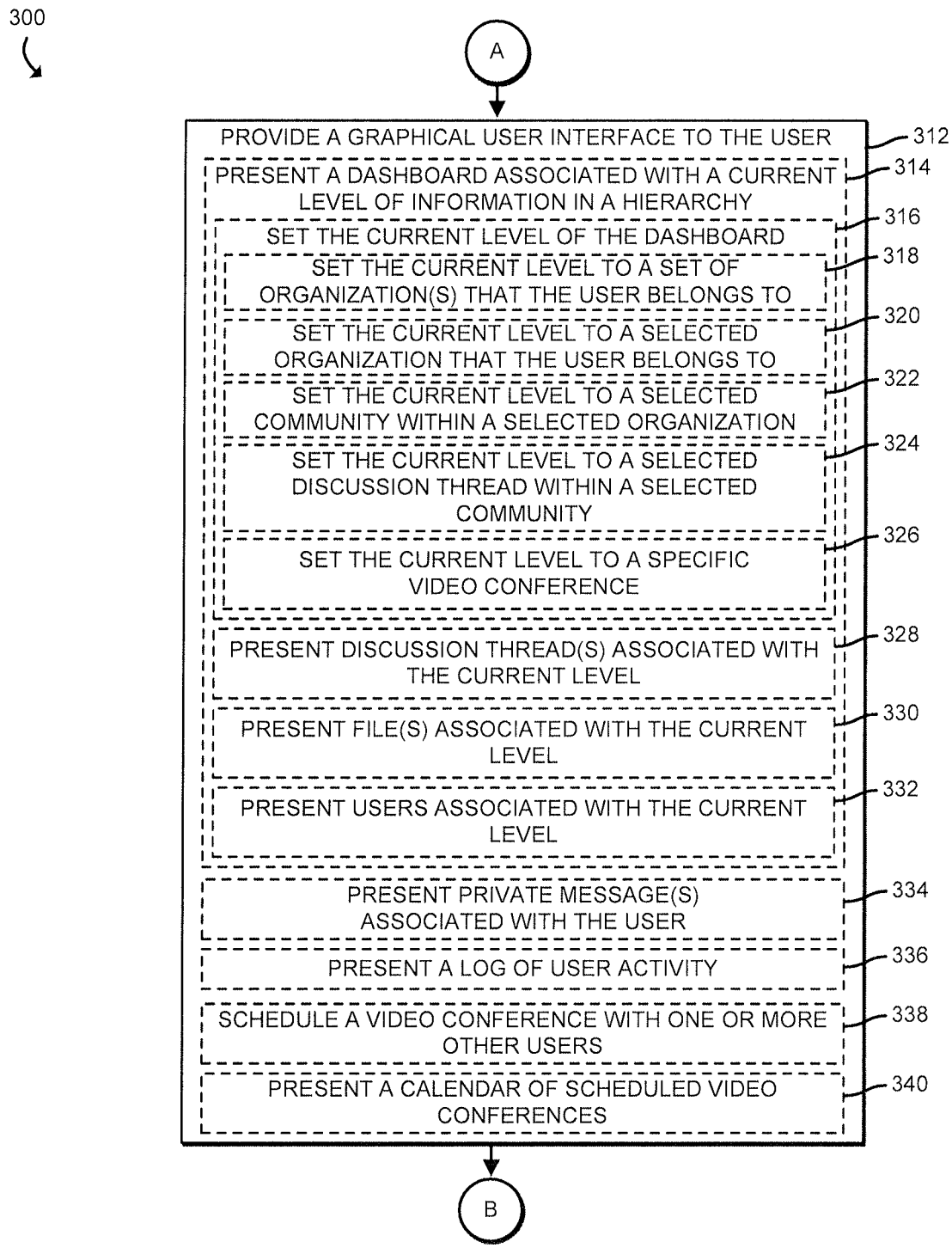

Referring now to FIG. 4, in providing a graphical user interface to the user, the server compute device 110 may present (e.g., send code defining) a dashboard (e.g., a graphical user interface containing a report or at-a-glance view of one or more categories of data) associated with a current level in a hierarchy, as indicated in block 314. In doing so, and as indicated in block 316, the server compute device 110 sets the current level of the dashboard. In the illustrative embodiment, the server compute device 110 may initially set the current level to a default level (e.g., defined by a configuration setting associated with the user, defined by a configuration setting for the entire platform, etc.). Further, the server compute device 110, in the illustrative embodiment, is operable to set the current level to a different level selected by the user (e.g., in response to receiving data indicative of the selected level from the user compute device 120).

As indicated in block 318, the server compute device 110 may set the current level to a set of all of the organizations that the user of the corresponding user compute device 120 belongs to (e.g., as defined in user account data stored in the data storage 222). Alternatively, the server compute device 110 may set the current level to a selected (e.g., selected by the user of the user compute device 120) organization that the user belongs to, as indicated in block 320. For example, the dashboard may initially display multiple organizations that the user belongs to and the user may select one of those organizations, thereby setting the current level of the dashboard to that selected organization. Alternatively, the server compute device 110 may set the current level to a selected community within a selected organization (e.g., in response to the user selecting a community within an organization on the user compute device 120), as indicated in block 322. As indicated in block 324, the server compute device 110 may alternatively set the current level to a selected discussion thread within a selected community (e.g., in response to the user selecting the discussion thread on the user compute device 120). In some embodiments, the server compute device 110 may set the current level to a specific video conference, as indicated in block 326.

Figure 7:
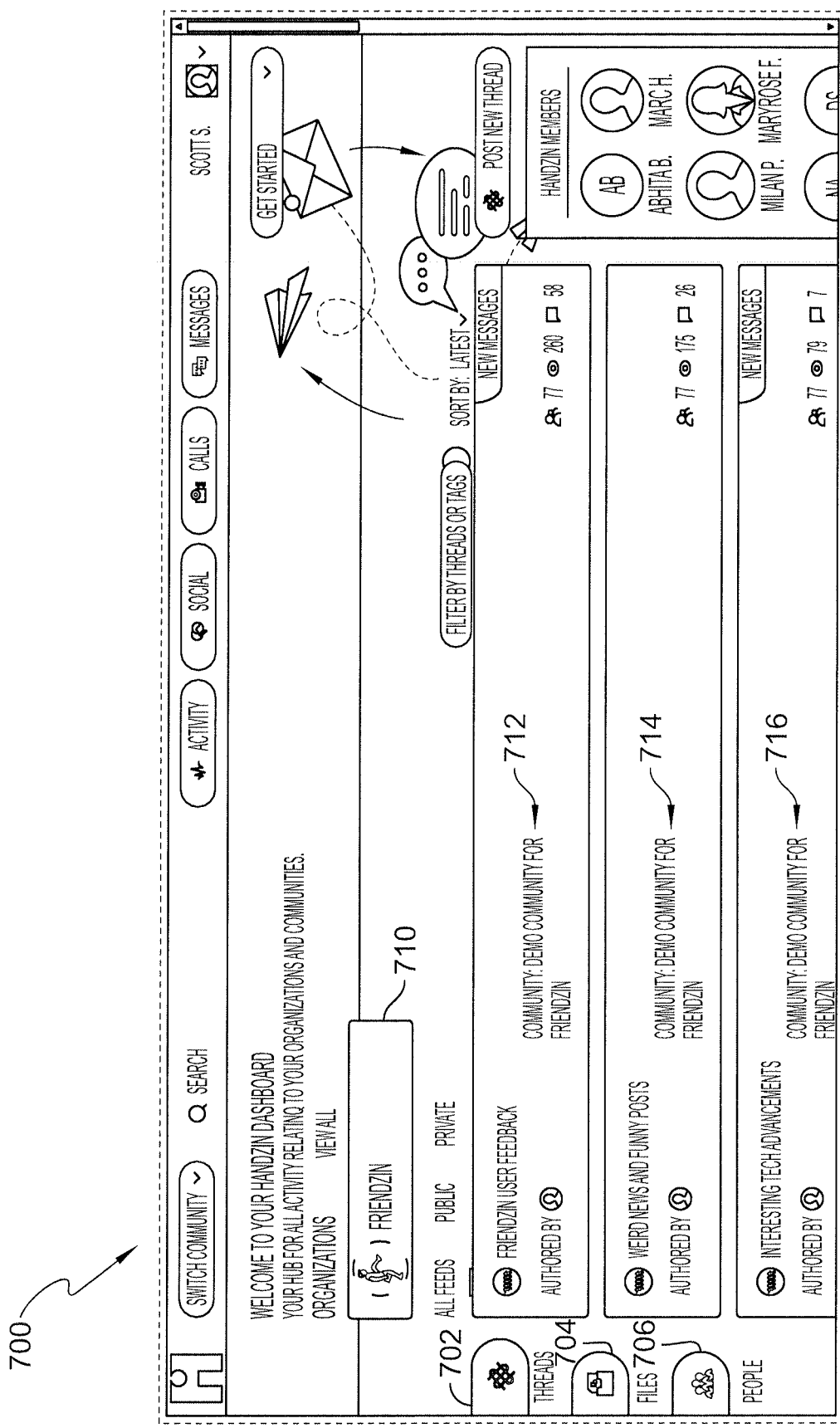

As indicated in block 328, in presenting the dashboard, the server compute device 110, in the illustrative embodiment, presents one or more discussion threads associated with the current level (e.g., the level that was set in block 316). Referring briefly to FIG. 7, an example embodiment of a dashboard 700 presented by the system 100 includes a set of discussion threads 712, 714, 716 associated with the organizations that the user belongs to. A set of selectable elements 702, 704, 706 presented on the dashboard 700 define a menu from which the user may select whether to view discussion threads, files, or people associated with the current level of the dashboard. A further selectable element 710 represents an organization of the set of organizations that the current user belongs to, and if selected, causes the current level of the dashboard to change to that selected organization. As indicated in block 330, the server compute in device 110, the illustrative embodiment, may present one or more files associated with the current level (e.g., one or more files shared by users in association with the selected organization, community, discussion thread, etc.).

Figure 8:
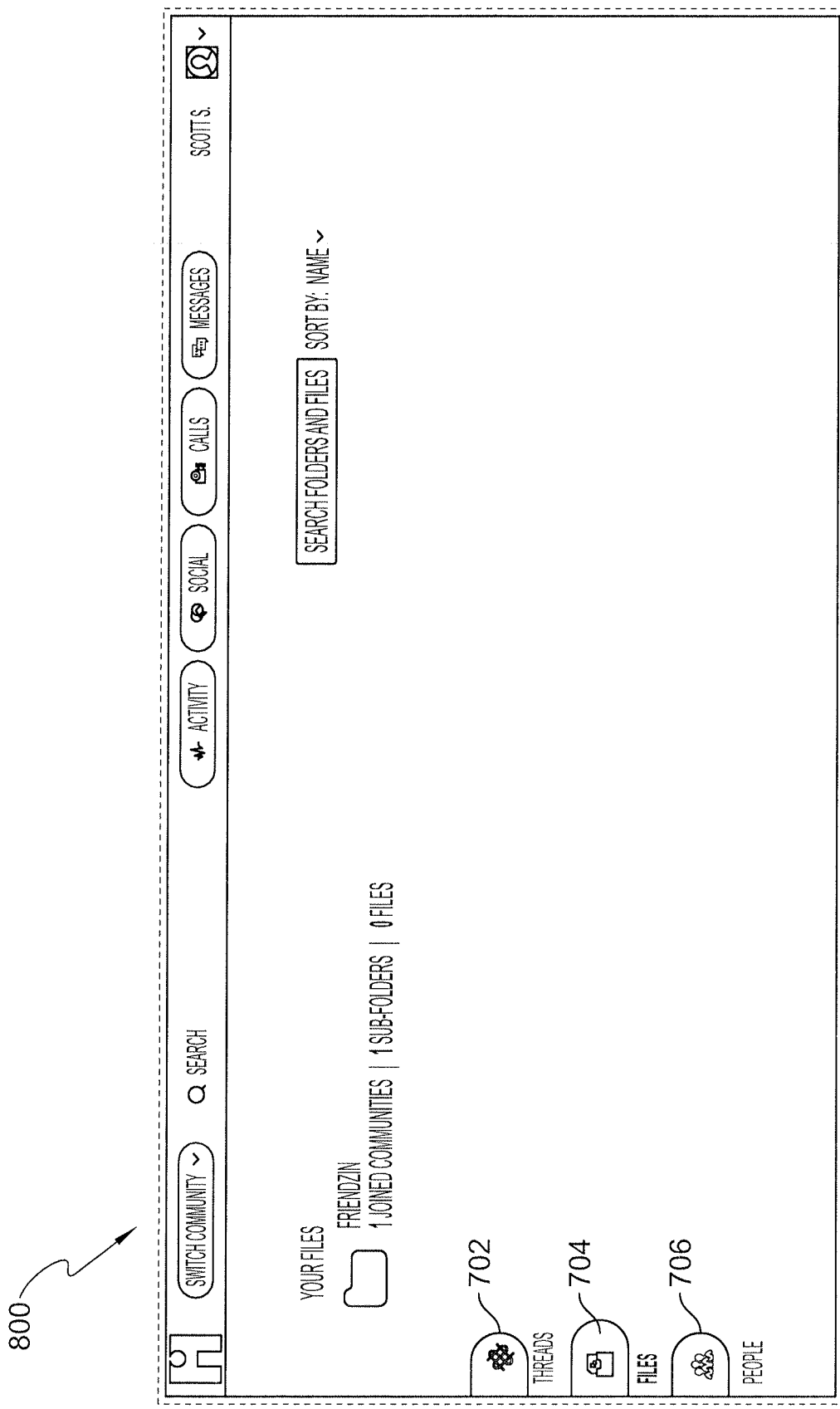
Figure 9:
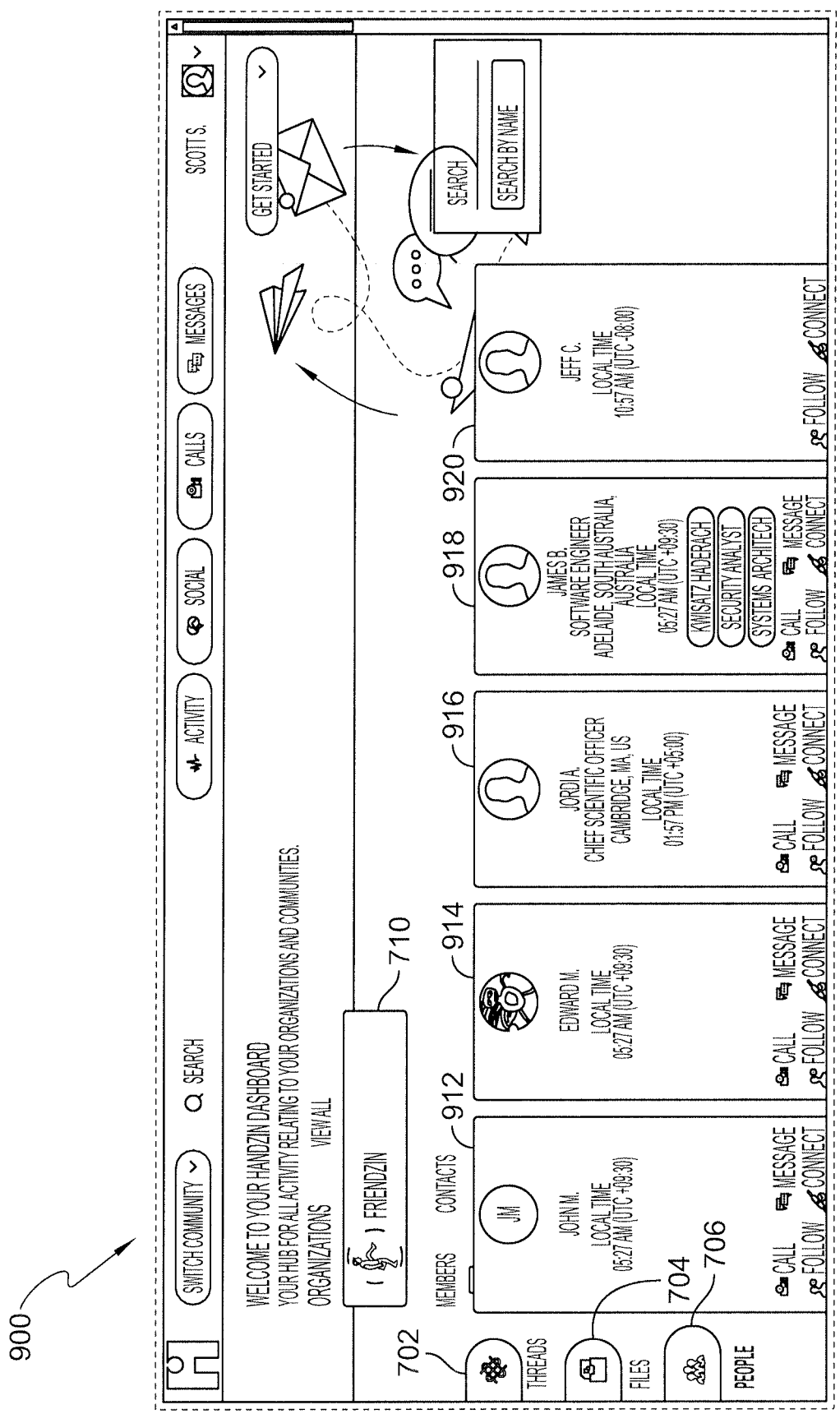
Figure 10:
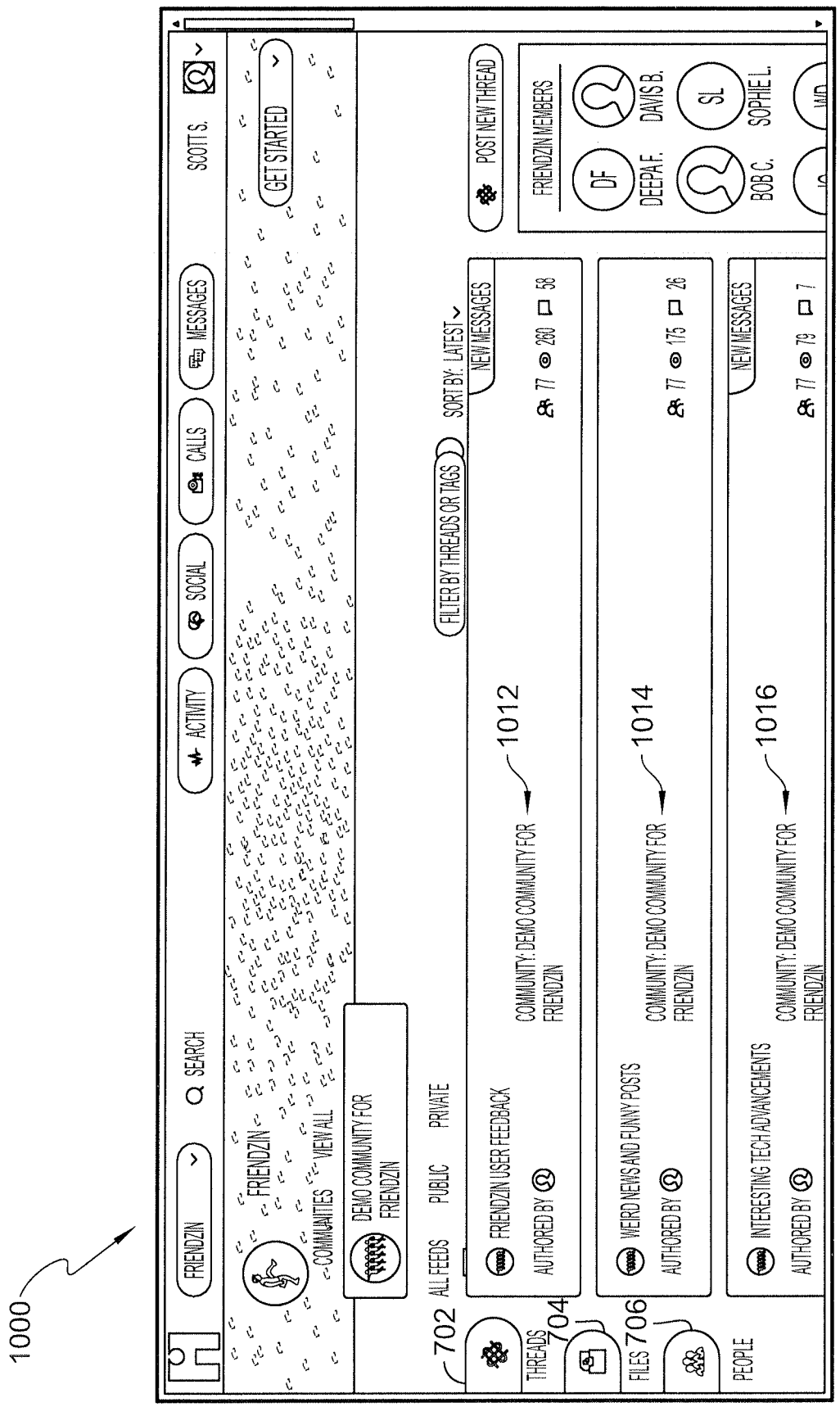
Figure 11:
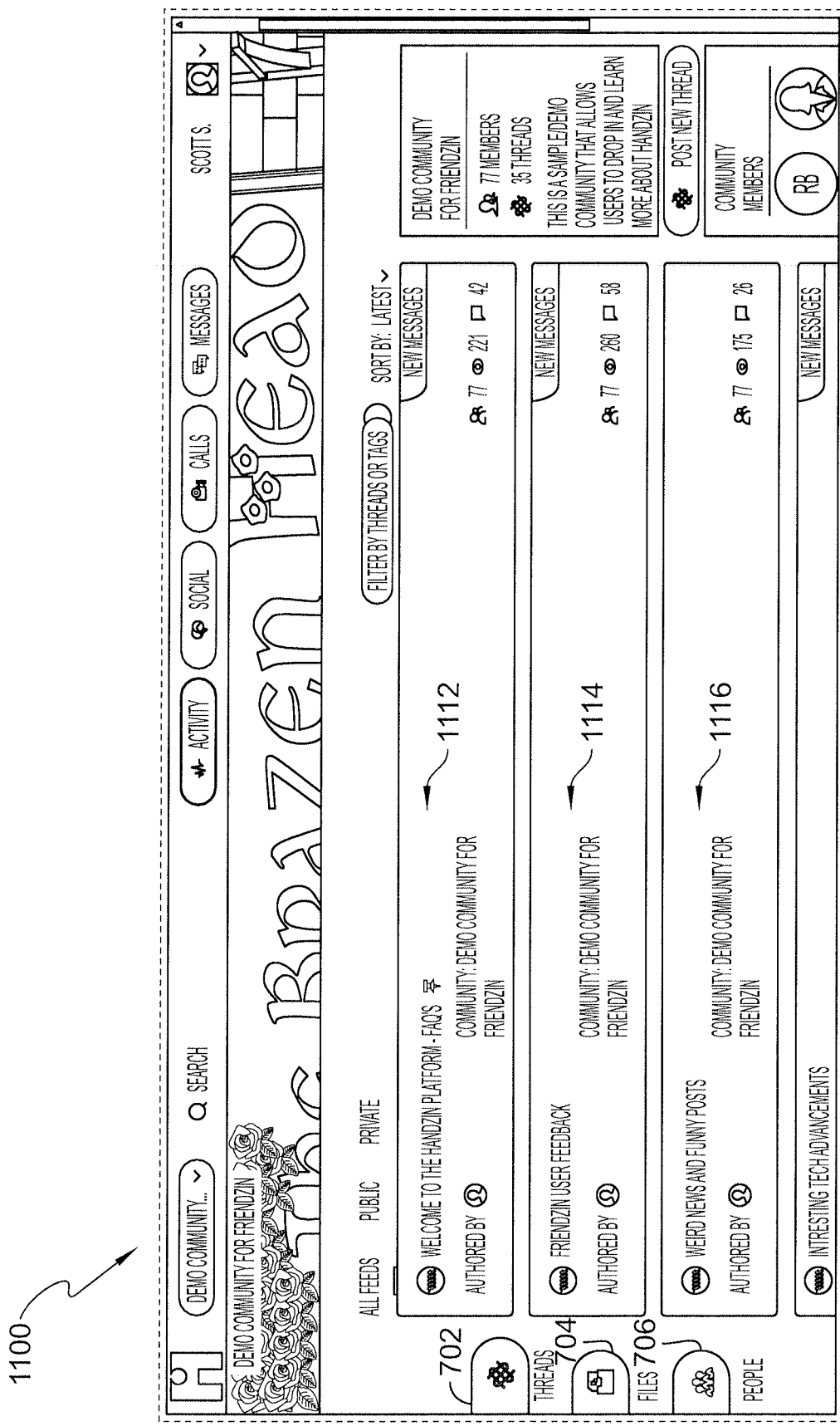
Figure 12:
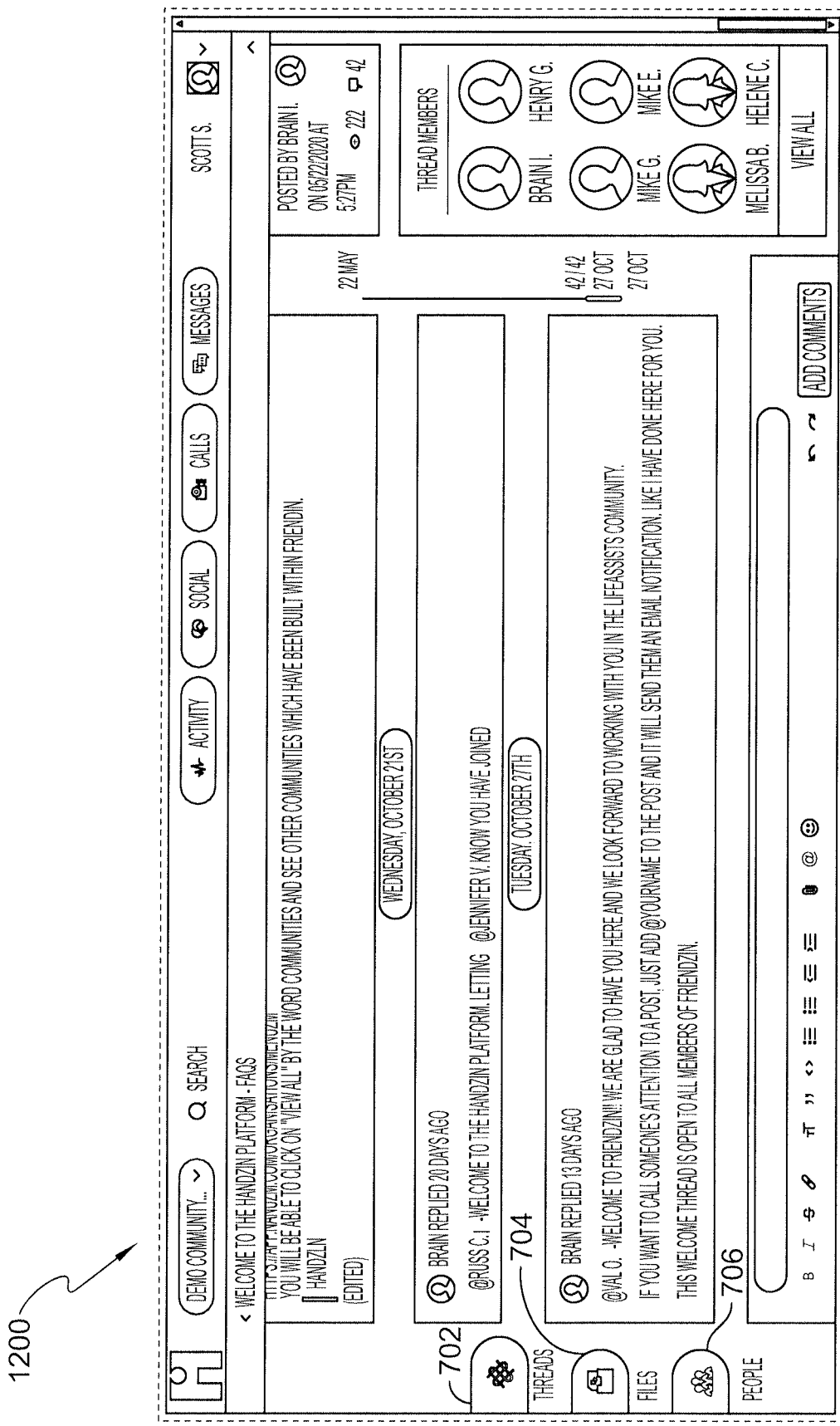
Figure 13:
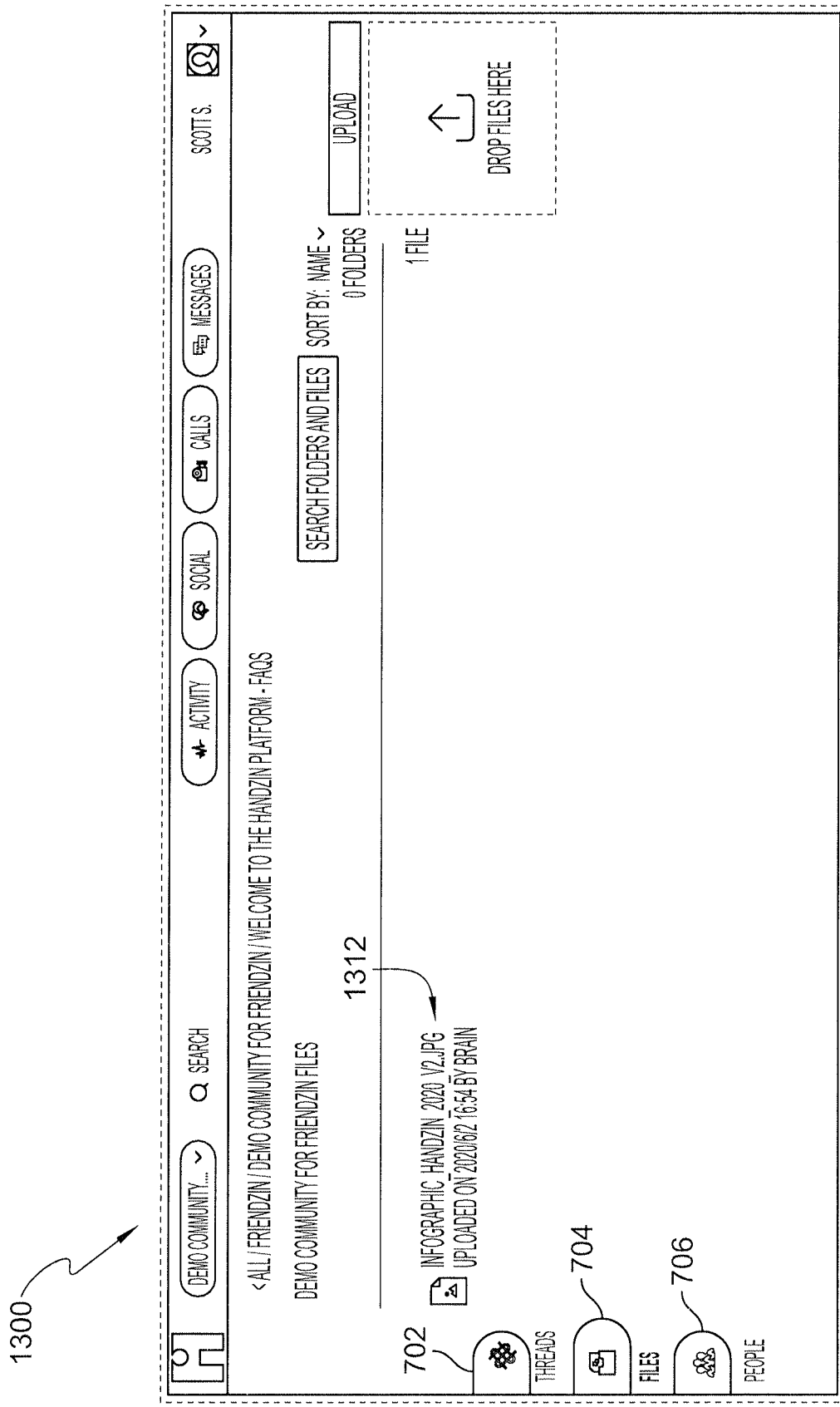
Figure 14:
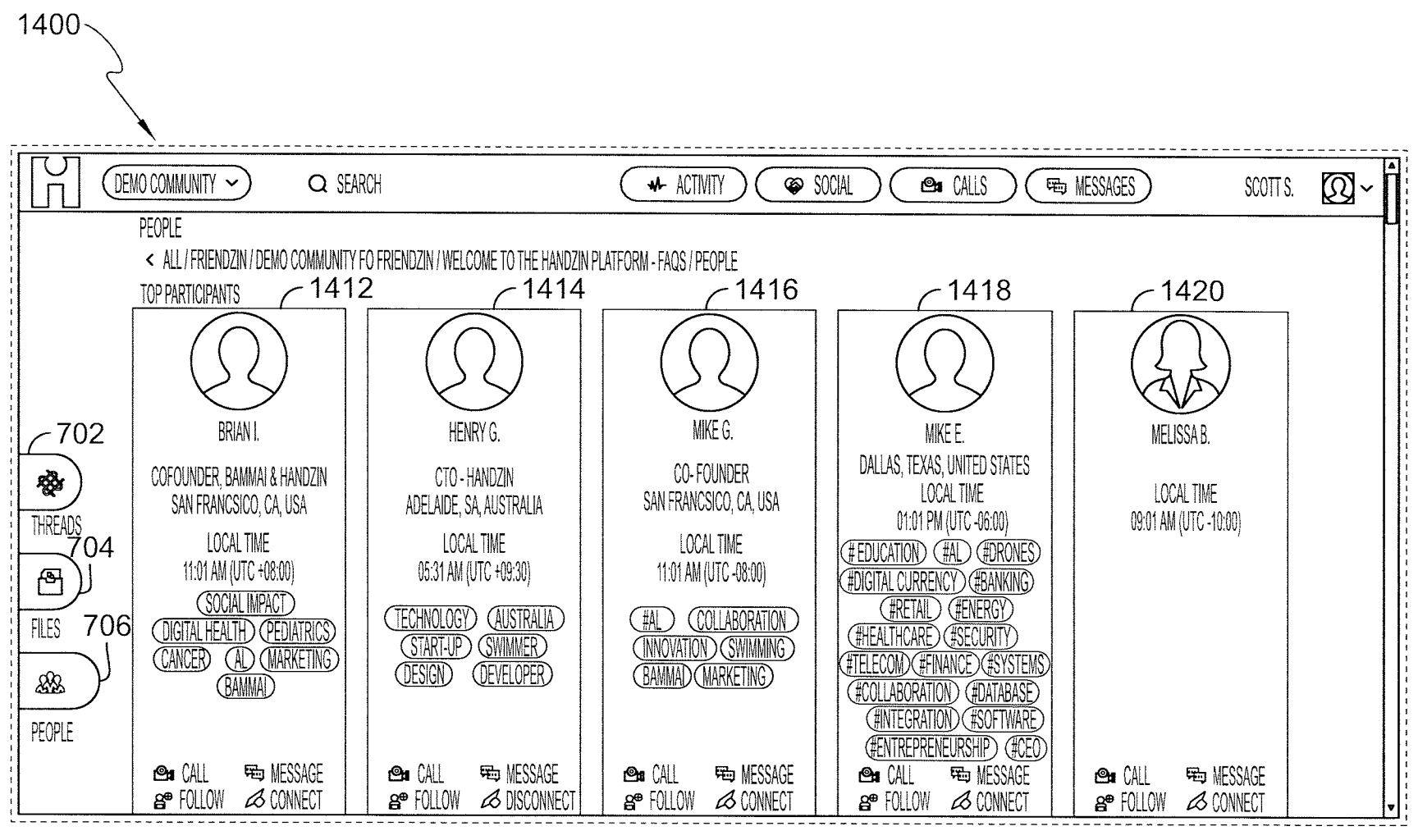

Referring briefly to FIG. 8, an example embodiment of a dashboard 800 presented by the system 100 includes data indicative of files associated with organizations that the user belongs to. Referring back to FIG. 4, in the illustrative embodiment, the server compute device 110 may present users (e.g., in a list) that are associated with the current level (e.g., the selected organization, community, discussion thread, etc.), as indicated in block 332. Referring to FIG. 9, an embodiment of a dashboard 900 that may be presented by the system 100 includes a listing of people 912, 914, 916, 918, 920 associated with organizations to which the user belongs. Turning to FIG. 10, an embodiment of a dashboard 1000 that may be presented by the system 100 (e.g., upon selection of the element 710 in the dashboard 700), includes a listing of discussion threads 1012, 1014, 1016 associated with the selected organization. Furthermore, the dashboard 1000 includes a selectable element 1010 that, if selected, changes the current level to a particular community within the selected organization that the user belongs to. Referring to FIG. 11, an embodiment of a dashboard 1100 that may be presented by the system 100 (e.g., in response to the user selecting the element 1010 on the dashboard 1000) includes a listing of discussion threads 1112, 1114, 1116 associated with a selected community within a selected organization that the user belongs to. Referring now to FIG. 12, an embodiment of a dashboard 1200 that may be presented by the system 100 (e.g., in response to a user selection of the discussion thread 1112 included in the dashboard 1000) shows communications submitted by users in association with the selected thread. In other words, the dashboard 1200 presents discussion thread data at the level of a selected discussion thread. Referring briefly to FIG. 13, an embodiment of a dashboard 1300 presenting information at the level of a selected discussion thread includes a file 1312 associated with that selected discussion thread. Turning to FIG. 14, an embodiment of a dashboard 1400 that may be presented by the system 100 includes a listing of people 1412, 1414, 1416, 1418, 1420 associated with the selected discussion thread.

Figure 15:
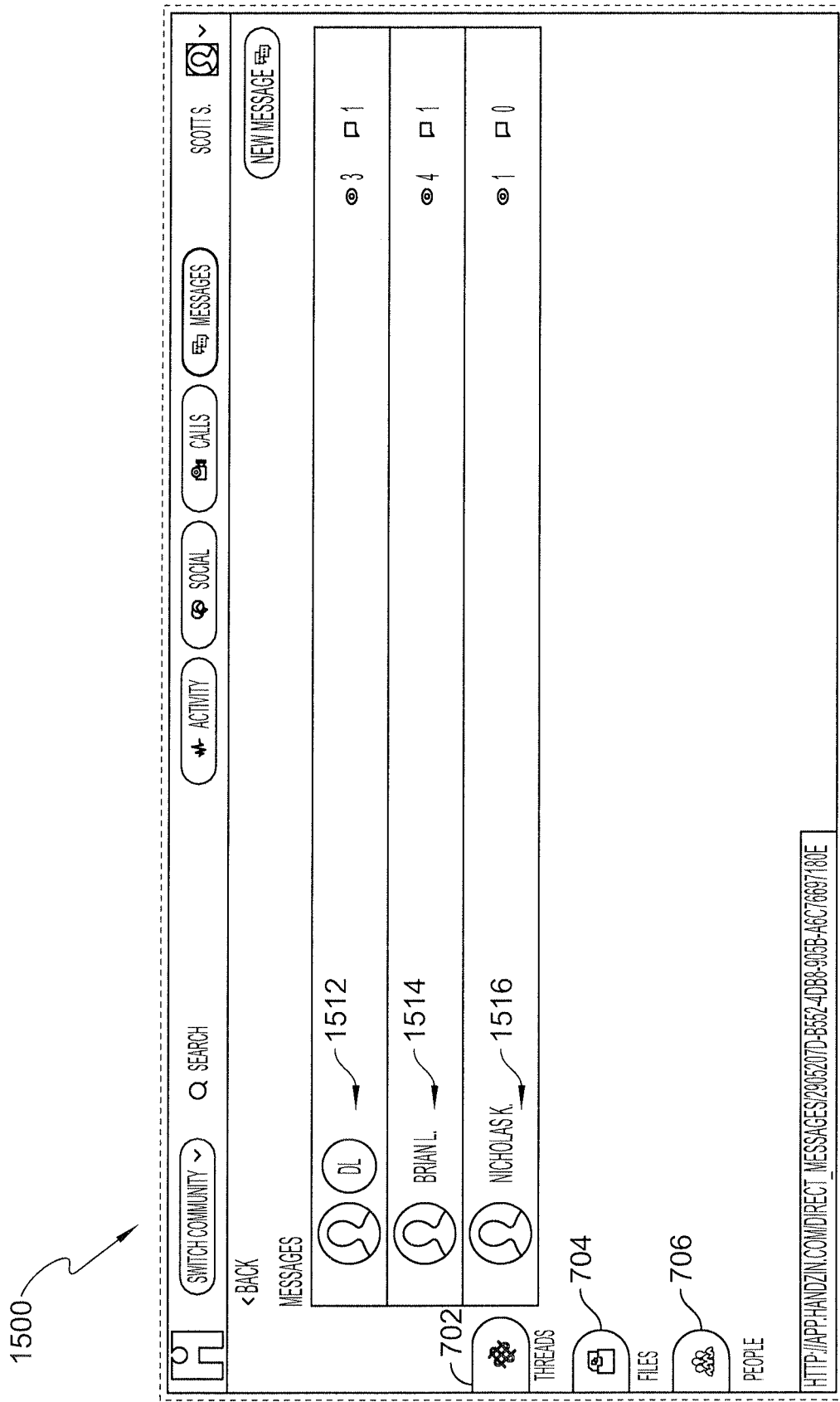
Figure 16:
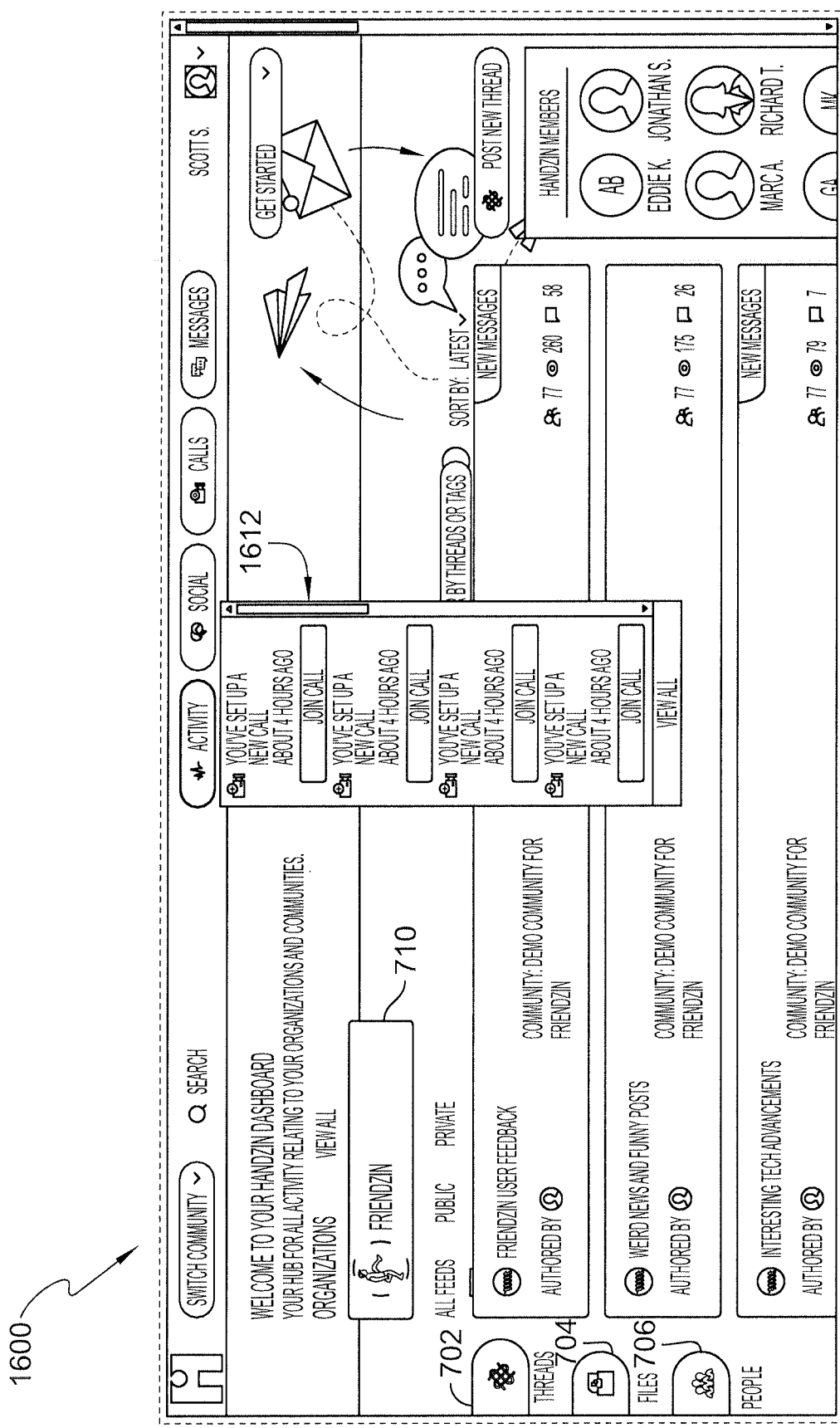

As indicated in block 334, the server compute device 110 may present a set of messages associated with the user of the user compute device. For example, the server compute device 110 may present messages sent to the current user from another user and/or messages sent from the current user to other users. An embodiment of a graphical user interface 1500 presenting selectable messages 1512, 1514, 1516 associated with the current user is shown in FIG. 15. In the illustrative embodiment, the system 100 presents the content of a message upon selection of that message in the graphical user interface 1500. Alternatively, the server compute device 110 may present a log of user activity (e.g., video conferences that the user has set up over time, invitations that the user has received from other users to join a video conference, mentions of the user in a discussion thread, connection requests from other users, etc.) as indicated in block 336. An embodiment of a graphical user interface 1600 presenting an activity log 1612 associated with the present user is shown in FIG. 16.

Figure 17:
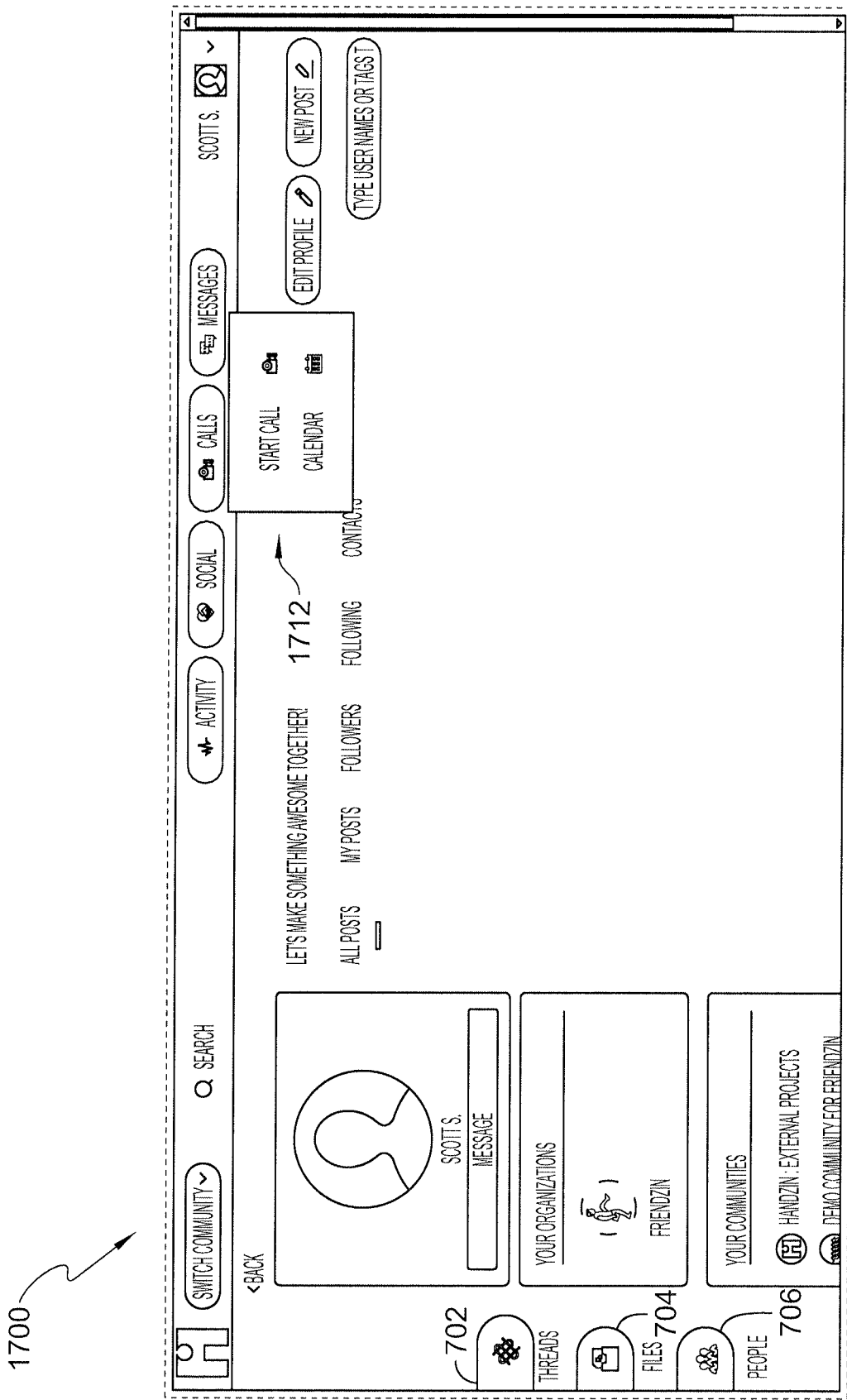
Figure 18:
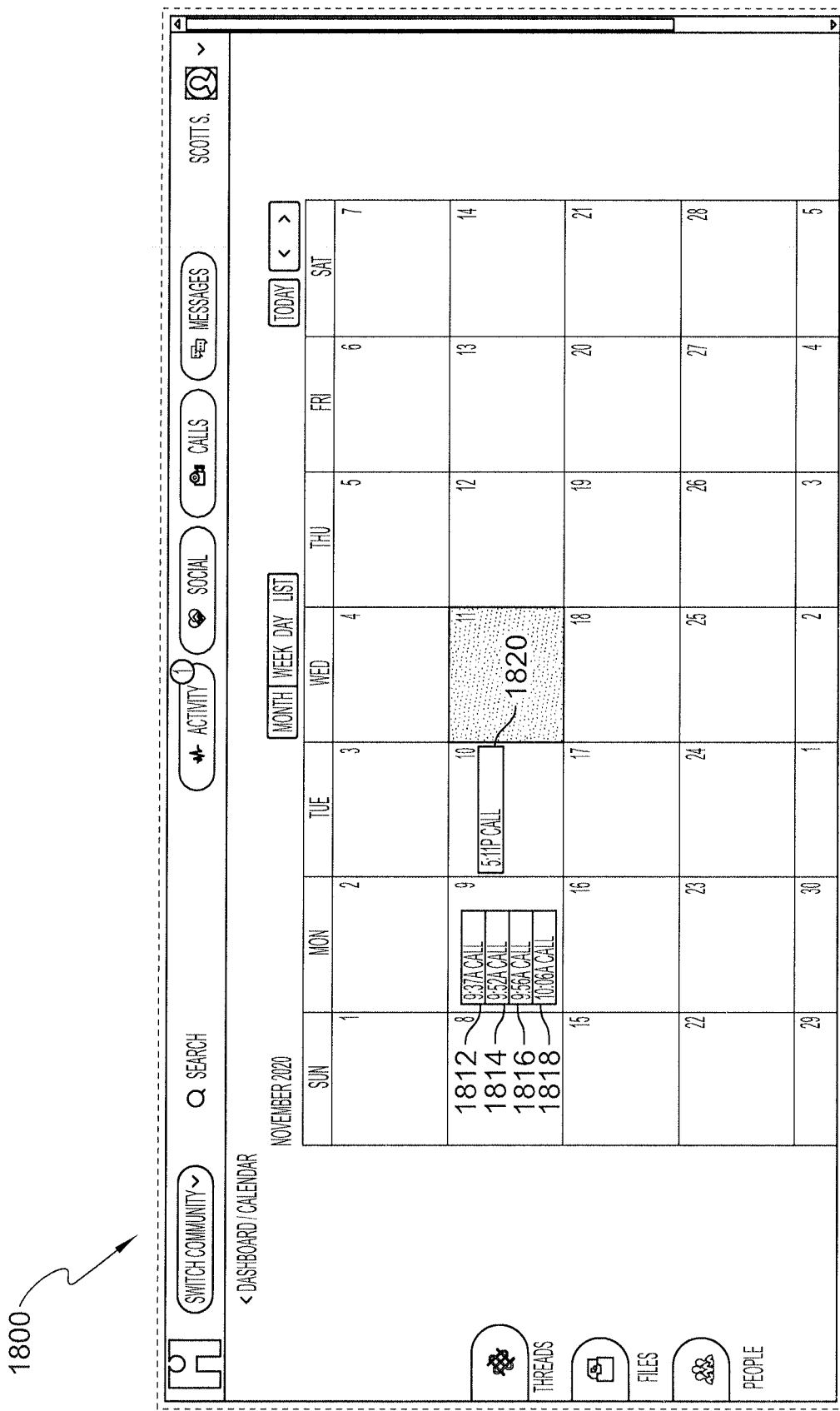

Referring back to FIG. 4, as indicated in block 338, the server compute device 110 may schedule a video conference (e.g., for a date and time in the future or immediately) with one or more other users of the system 100, based on corresponding data sent to the server compute device 110 from the user compute device 120 (e.g., in response to information input by the user of the user compute device 120). An example embodiment of a graphical user interface 1700 enabling a user to schedule a video conference, from a drop down menu 1712, is shown in FIG. 17. The server compute device 110 may additionally or alternatively present a calendar of scheduled video conferences, as indicated in block 340. An example embodiment of a graphical user interface 1800 presenting a calendar of video conferences 1812, 1814, 1816, 1818 associated with the current user is shown in FIG. 18.

Figure 5:
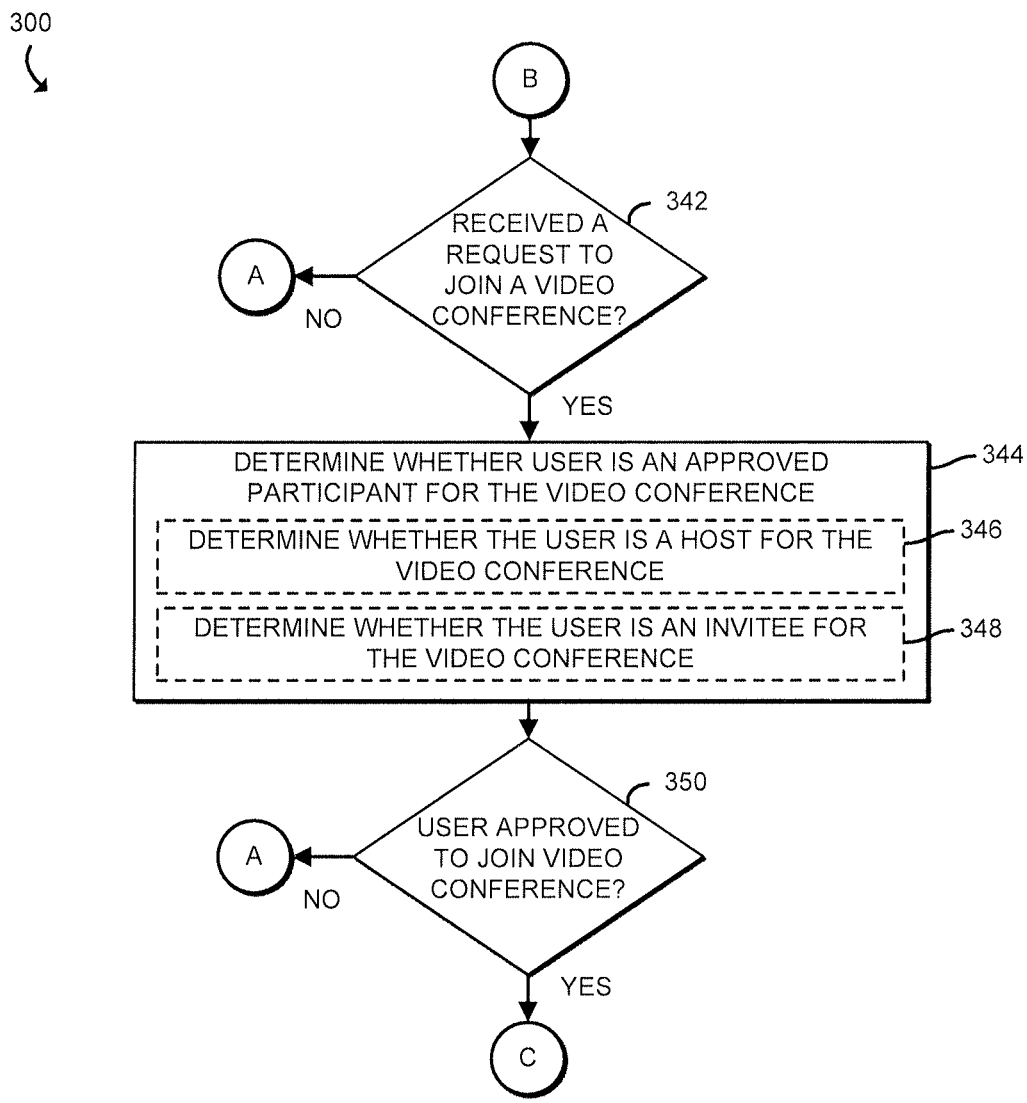

Referring now to FIG. 5, and continuing the method 300, the server compute device 110 may determine whether a request to join a video conference has been received (e.g., from the user compute device 110), as indicated in block 342. If not, the method 300 loops back to block 312 to continue to present the dashboard at the current level. Otherwise (e.g., if a request to join a video conference has been received), the method 300 advances to block 344, in which the server compute device 110 determines whether the user (e.g., associated with the user compute device 120 that sent the request) is an approved participant for the video conference. In doing so, and as indicated in block 346, the server compute device 110 may determine whether the user is a host (e.g., organizer) for the video conference (e.g., the user scheduled or initiated the video conference), as indicated in block 346. The server compute device 110 may also determine whether the user is an invitee for the video conference (e.g., the video conference was set up by a different user and the current user is designated as a participant to the video conference), as indicated in block 348. In block 350, the server compute device 110 determines the subsequent course of action based on whether the user is approved to join the video conference associated with the request (e.g., whether either of the conditions in block 346, 348 is true). If not, the method 300 loops back to block 312 of FIG. 4, in which the server compute device 110 continues to present the dashboard at the current level. In some embodiments, the server compute device 110 may additionally present a message to the user (e.g., by sending code to the corresponding user compute device 110 to display the message) indicating that the user is not approved to join the video conference. Otherwise, if the user is approved to join the video conference, the method 300 advances to block 352 of FIG. 6, in which the server compute device 110 presents (e.g., by sending corresponding code to the user compute device 120) a graphical user interface that enables the user to hold the video conference with other approved participants (e.g., accessing the server compute device 110 with corresponding user compute devices 120).

Figure 6:
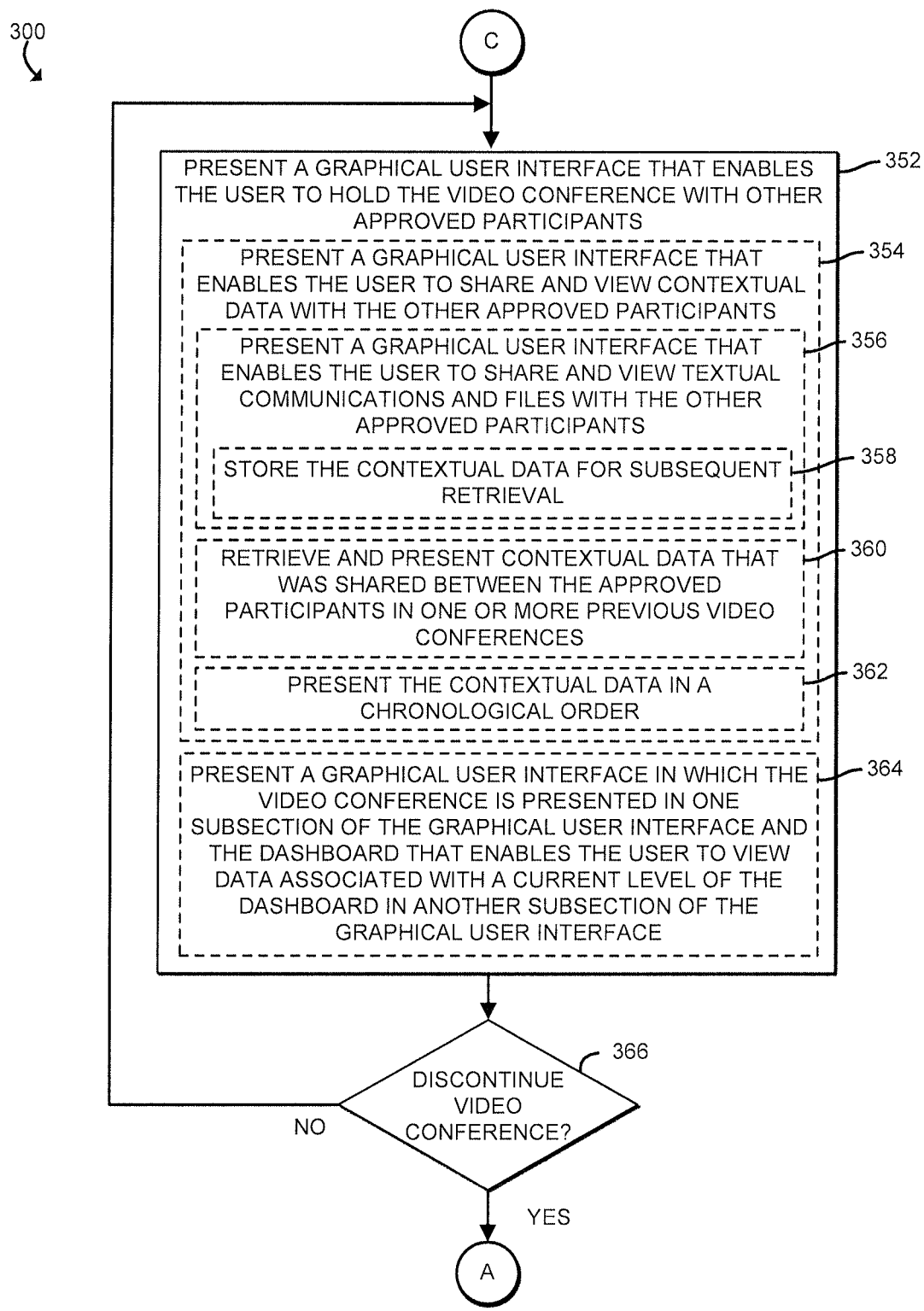
Figure 19:
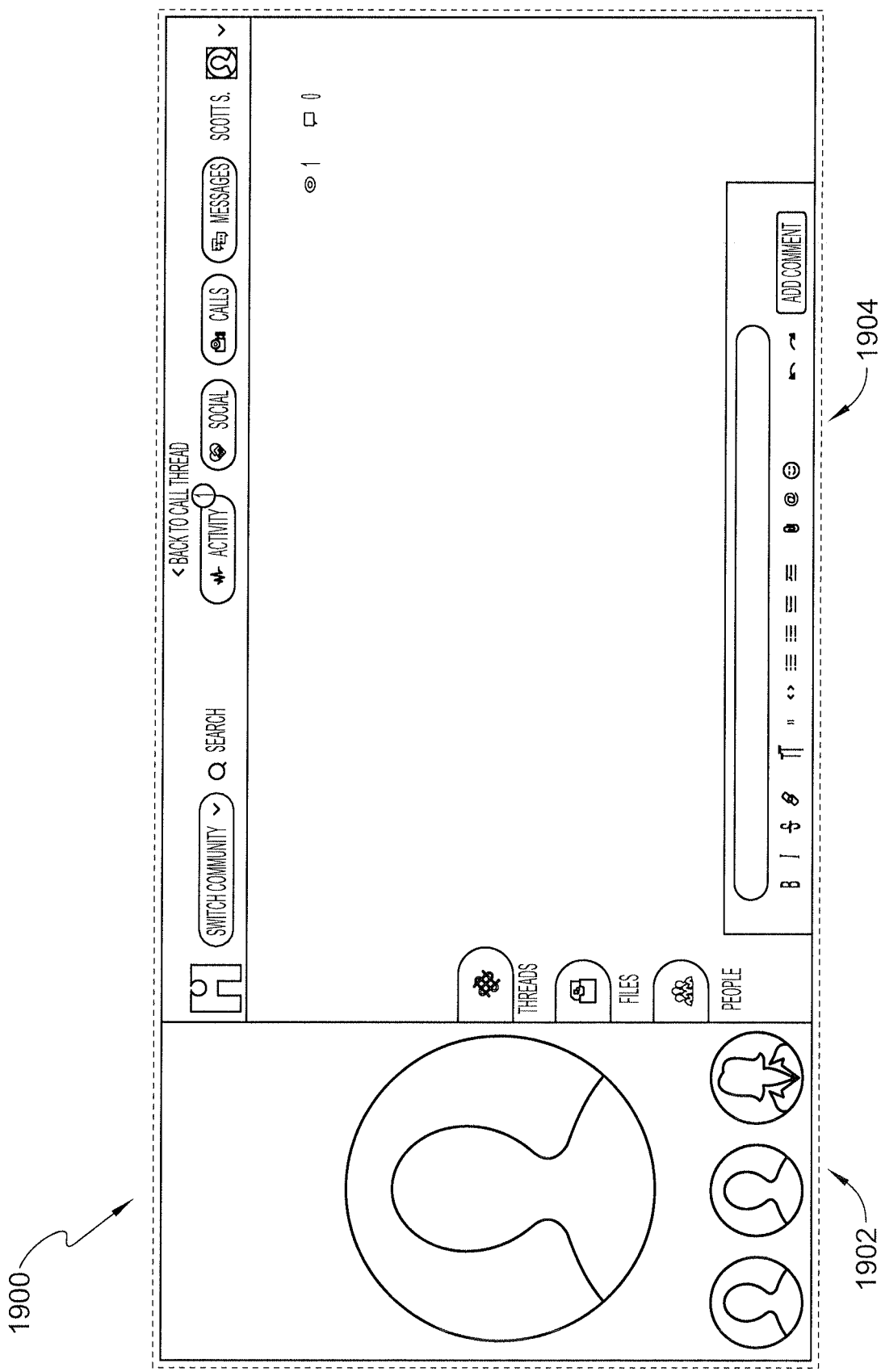

Referring now to FIG. 6, in presenting a graphical user interface that enables the user to hold the video conference with other approved participants, the server compute device 110 may present a graphical user interface that enables the user to share and view contextual data with other approved participants, as indicated in block 354. In doing so, and as indicated in block 356, the server compute device 110 may present a graphical user interface that enables the user to share and view textual communications and/or files with other approved participants. Referring briefly to FIG. 19, an example embodiment of a graphical user interface 1900 that may be presented by the server compute device 110 (e.g., by sending code to the user compute device 120 to render) includes a subsection 1902 showing a video feed of a participant in a video conference and another subsection 1904 in which textual messages and/or files may be submitted in connection with the video conference, as contextual data.

Figure 20:
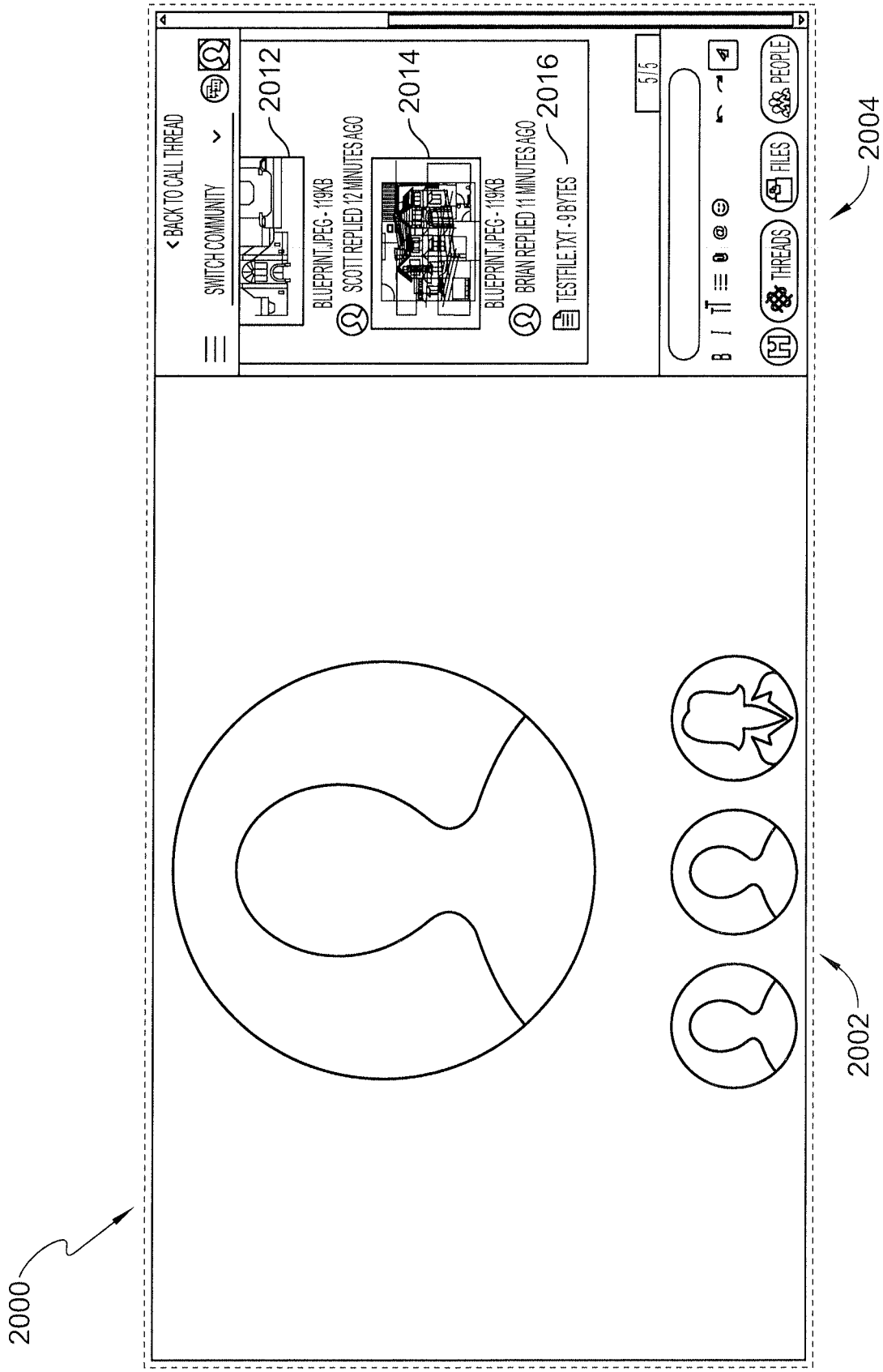

Referring to FIG. 20 another example graphical user interface 2000 that may be presented by the server compute device 110 shows a video feed associated with a video conference in a subsection 2002, similar to the subsection 1902 but occupying a larger portion of the user interface, and a subsection 2004, similar to the subsection 1904, but occupying a smaller portion of the user interface and displaying contextual data 2012, 2014, 2016 that have been shared in association with the video conference. The server compute device 110 stores (e.g., in data storage 222) any contextual data shared between participants in a video conference, as indicated in block 358.

As indicated in block 360, the server compute device 110 also retrieves and presents contextual data that was shared between the approved participants in one or more previous video conferences, as indicated in block 360. In doing so, and as indicated in block 362, the server compute device 110 presents the contextual data in chronological order (e.g., oldest to newest). In some embodiments, the server compute device 110 may add indicators of when each piece of contextual data was shared and/or which user shared each item of contextual data. As such, unlike typical video conferencing systems, the system 100 enables users to quickly access the contextual data from previous video conferences between the participants regarding a topic by retrieving and presenting contextual data in the subsection 2004 of the video conference user interface 2000. Moreover, and as indicated in block 364, the server compute device 110 may present a graphical user interface in which the video conference (e.g., video feed(s)) is located in one subsection of the user interface and a dashboard that enables the user to view data associated with a current level of the dashboard (e.g., similar to the dashboard described relative to block 312 of FIG. 4) is located in another subsection of the graphical user interface. As such, the user may participate in a video conference while concurrently accessing information in the platform related to any level of a hierarchy (e.g., all organizations that the user belongs to, a selected organization that the user belongs to, a selected community within a selected organization, a selected discussion thread within a selected community, etc.), to reference information that may be pertinent to the topic of the video conference.

Figure 21:
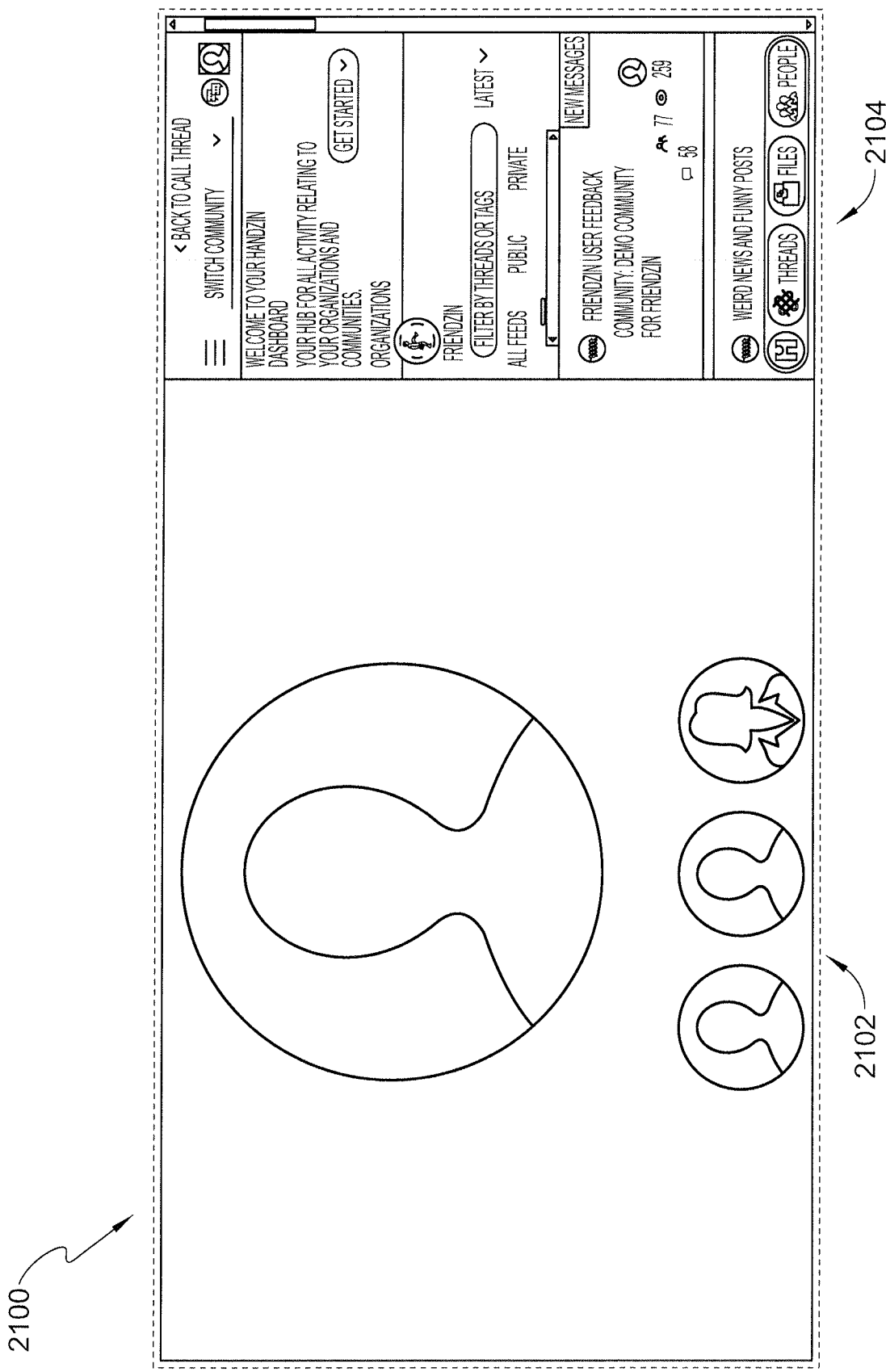
Figure 22:
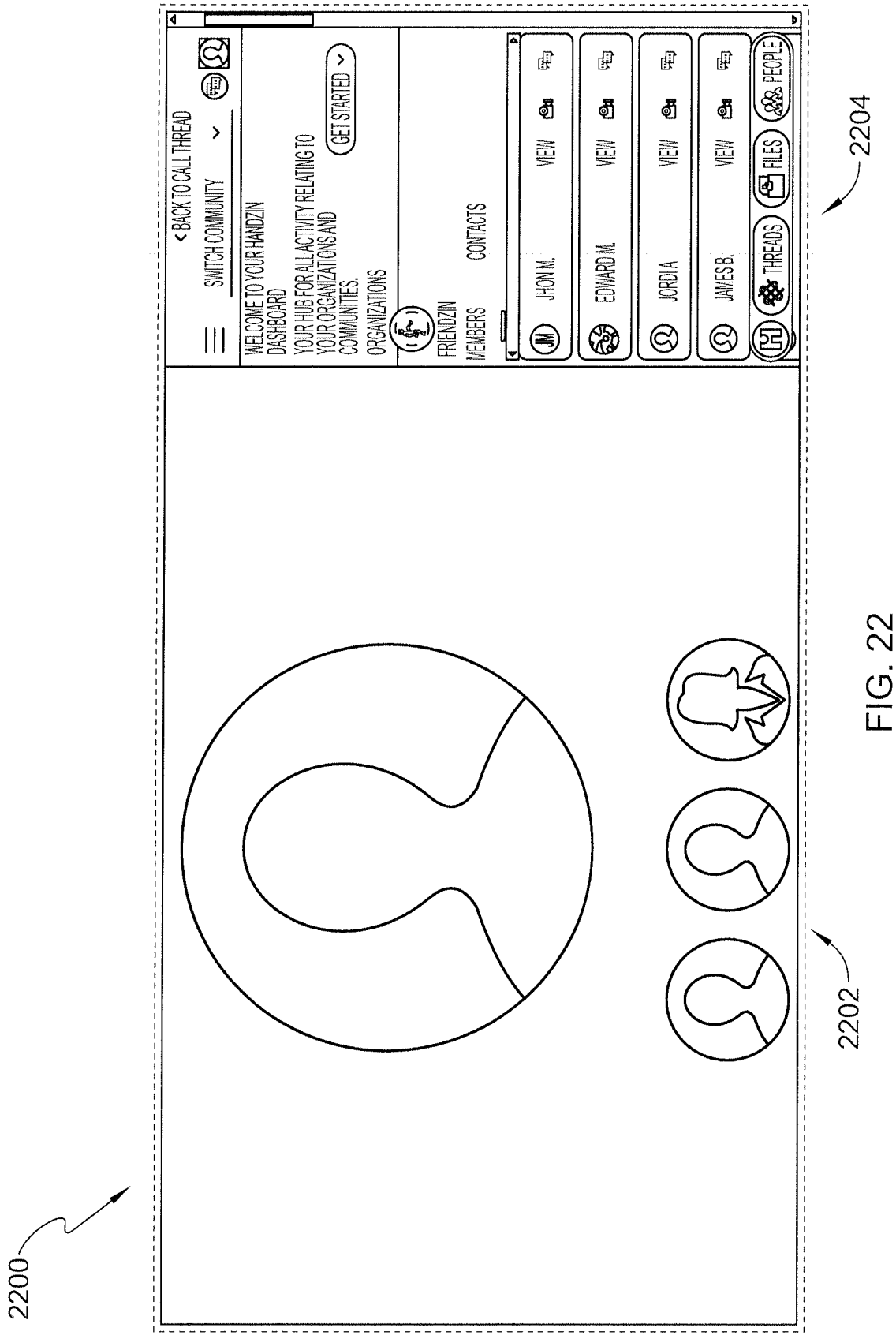

FIG. 21 shows an example graphical user interface 2100 in accordance with block 364, in which the video conference (e.g., video feed(s)) is shown in subsection 2102 and the dashboard presenting a listing of discussion threads associated with the organizations that the current user belongs to is shown in subsection 2104. FIG. 22 shows another example graphical user interface 2200 in accordance with block 364, in which the video conference (e.g., video feed(s)) is shown in subsection 2202 and the dashboard presenting a listing of people associated with the organizations that the current user belongs to is shown in subsection 2204. In block 366, the server compute device 110 determines whether to discontinue the video conference (e.g., whether a user has selected an option to end the video conference). If not, the method 300 loops back to block 352 to continue to present the graphical user interface that enables the user to hold the video conference with other approved participants. Otherwise, the method 300 loops back to block 312 of FIG. 4 to present the graphical user interface with the dashboard (i.e., discontinuing the video conference).

The method 300 is described above with reference to a single user, for clarity. However, it should be understood that the method 300, in the illustrative embodiment, is performed for each of multiple users concurrently using the system 100 (e.g., through respective user compute devices 120). Furthermore, while the operations in the method 300 are shown and described in a particular order, it should be understood that the operations could be performed in a different order or concurrently.

While certain illustrative embodiments have been described in detail in the drawings and the foregoing description, such an illustration and description is to be considered as exemplary and not restrictive in character, it being understood that only illustrative embodiments have been shown and described and that all changes and modifications that come within the spirit of the disclosure are desired to be protected. There exist a plurality of advantages of the present disclosure arising from the various features of the apparatus, systems, and methods described herein. It will be noted that alternative embodiments of the apparatus, systems, and methods of the present disclosure may not include all of the features described, yet still benefit from at least some of the advantages of such features. Those of ordinary skill in the art may readily devise their own implementations of the apparatus, systems, and methods that incorporate one or more of the features of the present disclosure.

EXAMPLES

Illustrative examples of the technologies disclosed herein are provided below. An embodiment of the technologies may include any one or more, and any combination of, the examples described below.

Example 1 includes a compute device comprising circuitry configured to provide a graphical user interface that enables authenticated and approved users to hold a first video conference and share contextual data among the users in association with the first video conference; store a record of the contextual data shared among the authenticated and approved users; and provide, in the graphical user interface and in association with a subsequent video conference among the users, the record of the contextual data that was shared among the users in association with the first video conference, wherein the contextual data includes at least one of a textual communication and a file.

Example 2 includes the subject matter of Example 1, and wherein the circuitry is further to cause the graphical user interface to list the contextual data in chronological order.

Example 3 includes the subject matter of any of Examples 1 and 2, and wherein the circuitry is further configured to provide a graphical user interface that includes a dashboard, wherein the dashboard displays at least one of discussion threads, files, and people associated with a present level selected from a hierarchy of levels.

Example 4 includes the subject matter of any of Examples 1-3, and wherein to provide a graphical user interface that includes a dashboard comprises to provide a graphical user interface that includes a dashboard that includes a first selectable element associated with discussion threads, a second selectable element associated with files, and a third selectable element associated with people.

Example 5 includes the subject matter of any of Examples 1-4, and wherein the circuitry is further to present, in the dashboard, one or more discussion threads associated with the present level in response to a selection of the first selectable element.

Example 6 includes the subject matter of any of Examples 1-5, and wherein the circuitry is further to present, in the dashboard, one or more files associated with the present level in response to a selection of the second selectable element.

Example 7 includes the subject matter of any of Examples 1-6, and wherein the circuitry is further to present, in the dashboard, one or more people associated with the present level in response to a selection of the third selectable element.

Example 8 includes the subject matter of any of Examples 1-7, and wherein the hierarchy of levels includes a first level that corresponds to a set of organizations that the user belongs to, a second level that corresponds to a selected organization that the user belongs, a third level that corresponds to a selected community within the selected organization, a fourth level that corresponds to a selected discussion thread within a selected community, and a fifth level that corresponds to a specific video conference.

Example 9 includes the subject matter of any of Examples 1-8, and wherein to provide the graphical user interface comprises to provide a graphical user interface in which a video conference and contextual data are displayed in a first subset of the graphical user interface and the dashboard is displayed in a second subset of the graphical user interface.

Example 10 includes the subject matter of any of Examples 1-9, and wherein to provide a graphical user interface comprises to provide a graphical user interface for a website, desktop application, or a mobile application.

Example 11 includes a method comprising providing, by a compute device, a graphical user interface that enables authenticated and approved users to hold a first video conference and share contextual data among the users in association with the first video conference; storing, by the compute device, a record of the contextual data shared among the authenticated and approved users; and providing, by the compute device, in the graphical user interface and in association with a subsequent video conference among the users, the record of the contextual data that was shared among the users in association with the first video conference, wherein the contextual data includes at least one of a textual communication and a file.

Example 12 includes the subject matter of Example 11, and further including causing, by the compute device, the graphical user interface to list the contextual data in chronological order.

Example 13 includes the subject matter of any of Examples 11 and 12, and further including providing, by the compute device, a graphical user interface that includes a dashboard, wherein the dashboard displays at least one of discussion threads, files, and people associated with a present level selected from a hierarchy of levels.

Example 14 includes the subject matter of any of Examples 11-13, and wherein providing a graphical user interface that includes a dashboard comprises providing a graphical user interface that includes a dashboard that includes a first selectable element associated with discussion threads, a second selectable element associated with files, and a third selectable element associated with people.

Example 15 includes the subject matter of any of Examples 11-14, and further including presenting, by the compute device and in the dashboard, one or more discussion threads associated with the present level in response to a selection of the first selectable element.

Example 16 includes the subject matter of any of Examples 11-15, and further including presenting, by the compute device and in the dashboard, one or more files associated with the present level in response to a selection of the second selectable element.

Example 17 includes the subject matter of any of Examples 11-16, and further including presenting, by the compute device and in the dashboard, one or more people associated with the present level in response to a selection of the third selectable element.

Example 18 includes the subject matter of any of Examples 11-17, and wherein the hierarchy of levels includes a first level that corresponds to a set of organizations that the user belongs to, a second level that corresponds to a selected organization that the user belongs, a third level that corresponds to a selected community within the selected organization, a fourth level that corresponds to a selected discussion thread within a selected community, and a fifth level that corresponds to a specific video conference.

Example 19 includes the subject matter of any of Examples 11-18, and wherein providing the graphical user interface comprises providing a graphical user interface in which a video conference and contextual data are displayed in a first subset of the graphical user interface and the dashboard is displayed in a second subset of the graphical user interface.

Example 20 includes the subject matter of any of Examples 11-19, and wherein providing a graphical user interface comprises providing a graphical user interface for a website, desktop application, or a mobile application.

Example 21 includes one or more machine-readable storage media comprising a plurality of instructions stored thereon that, in response to being executed, cause a compute device to provide a graphical user interface that enables authenticated and approved users to hold a first video conference and share contextual data among the users in association with the first video conference; store a record of the contextual data shared among the authenticated and approved users; and provide, in the graphical user interface and in association with a subsequent video conference among the users, the record of the contextual data that was shared among the users in association with the first video conference, wherein the contextual data includes at least one of a textual communication and a file.

Example 22 includes the subject matter of Example 21, and wherein the instructions further to cause compute device to list, in the graphical user interface, the contextual data in chronological order.

Example 23 includes the subject matter of any of Examples 21 and 22, and wherein the instructions further cause the compute device to provide a graphical user interface that includes a dashboard, wherein the dashboard displays at least one of discussion threads, files, and people associated with a present level selected from a hierarchy of levels.

Example 24 includes the subject matter of any of Examples 21-23, and wherein to provide a graphical user interface that includes a dashboard comprises to provide a graphical user interface that includes a dashboard that includes a first selectable element associated with discussion threads, a second selectable element associated with files, and a third selectable element associated with people.

Example 25 includes the subject matter of any of Examples 21-24, and wherein the instructions further to cause the compute device to present, in the dashboard, one or more discussion threads associated with the present level in response to a selection of the first selectable element.

Example 26 includes the subject matter of any of Examples 21-25, and wherein the instructions further to cause the compute device to present, in the dashboard, one or more files associated with the present level in response to a selection of the second selectable element.

Example 27 includes the subject matter of any of Examples 21-26, and wherein the instructions further to cause the compute device to present, in the dashboard, one or more people associated with the present level in response to a selection of the third selectable element.

Example 28 includes the subject matter of any of Examples 21-27, and wherein the hierarchy of levels includes a first level that corresponds to a set of organizations that the user belongs to, a second level that corresponds to a selected organization that the user belongs, a third level that corresponds to a selected community within the selected organization, a fourth level that corresponds to a selected discussion thread within a selected community, and a fifth level that corresponds to a specific video conference.

Example 29 includes the subject matter of any of Examples 21-28, and wherein to provide the graphical user interface comprises to provide a graphical user interface in which a video conference and contextual data are displayed in a first subset of the graphical user interface and the dashboard is displayed in a second subset of the graphical user interface.

Example 30 includes the subject matter of any of Examples 21-29, and wherein to provide a graphical user interface comprises to provide a graphical user interface for a website, desktop application, or a mobile application.

The invention claimed is:

1. A compute device comprising:
   circuitry configured to:
   provide a graphical user interface that enables authenticated and approved users to hold a first video conference and share contextual data among the users in association with the first video conference;
   store a record of the contextual data shared among the authenticated and approved users;
   provide, in the graphical user interface and in association with a subsequent video conference among the users, the record of the contextual data that was shared among the users in association with the first video conference, wherein the contextual data includes at least one of a textual communication and a file; and
   provide a dashboard that displays at least one of discussion threads, files, and people associated with a present level selected from a hierarchy of levels, wherein the hierarchy of levels includes a first level that corresponds to a set of organizations that the user belongs to, a second level that corresponds to a selected organization that the user belongs to, a third level that corresponds to a selected community within the selected organization, a fourth level that corresponds to a selected discussion thread within the selected community and any video conferences among users in the selected discussion thread, and a fifth level that corresponds to a specific video conference and its corresponding thread among users from one or more of the organizations.

2. The compute device of claim 1, wherein the circuitry is further to cause the graphical user interface to list the contextual data in chronological order.

3. The compute device of claim 1, wherein to provide a dashboard comprises to provide a dashboard that includes a first selectable element associated with discussion threads, a second selectable element associated with files, and a third selectable element associated with people.

4. The compute device of claim 3, wherein the circuitry is further to present, in the dashboard, one or more discussion threads associated with the present level in response to a selection of the first selectable element.

5. The compute device of claim 3, wherein the circuitry is further to present, in the dashboard, one or more files associated with the present level in response to a selection of the second selectable element.

6. The compute device of claim 3, wherein the circuitry is further to present, in the dashboard, one or more people associated with the present level in response to a selection of the third selectable element.

7. The compute device of claim 1, wherein to provide the graphical user interface comprises to provide a graphical user interface in which a video conference and contextual data are displayed in a first subset of the graphical user interface and the dashboard is displayed in a second subset of the graphical user interface.

8. The compute device of claim 1, wherein to provide a graphical user interface comprises to provide a graphical user interface for a website, desktop application, or a mobile application.

9. A method comprising:
   providing, by a compute device, a graphical user interface that enables authenticated and approved users to hold a first video conference and share contextual data among the users in association with the first video conference;

storing, by the compute device, a record of the contextual data shared among the authenticated and approved users;

providing, by the compute device, in the graphical user interface and in association with a subsequent video conference among the users, the record of the contextual data that was shared among the users in association with the first video conference, wherein the contextual data includes at least one of a textual communication and a file; and providing, by the compute device, a dashboard that displays at least one of discussion threads, files, and people associated with a present level selected from a hierarchy of levels, wherein the hierarchy of levels includes a first level that corresponds to a set of organizations that the user belongs to, a second level that corresponds to a selected organization that the user belongs to, a third level that corresponds to a selected community within the selected organization, a fourth level that corresponds to a selected discussion thread within the selected community and any video conferences among users in the selected discussion thread, and a fifth level that corresponds to a specific video conference and its corresponding thread among users from one or more of the organizations.

10. The method of claim 9, further comprising causing, by the compute device, the graphical user interface to list the contextual data in chronological order.

11. The method of claim 9, wherein providing a dashboard comprises providing a dashboard that includes a first selectable element associated with discussion threads, a second selectable element associated with files, and a third selectable element associated with people.

12. The method of claim 11, further comprising presenting, by the compute device and in the dashboard, one or more discussion threads associated with the present level in response to a selection of the first selectable element.

13. The method of claim 11, further comprising presenting, by the compute device and in the dashboard, one or more files associated with the present level in response to a selection of the second selectable element.

14. The method of claim 11, further comprising presenting, by the compute device and in the dashboard, one or more people associated with the present level in response to a selection of the third selectable element.

15. The method of claim 9, wherein providing the graphical user interface comprises providing a graphical user interface in which a video conference and contextual data are displayed in a first subset of the graphical user interface and the dashboard is displayed in a second subset of the graphical user interface.

16. One or more non-transitory machine-readable storage media comprising a plurality of instructions stored thereon that, in response to being executed, cause a compute device to:

provide a graphical user interface that enables authenticated and approved users to hold a first video conference and share contextual data among the users in association with the first video conference;

store a record of the contextual data shared among the authenticated and approved users;

provide, in the graphical user interface and in association with a subsequent video conference among the users, the record of the contextual data that was shared among the users in association with the first video conference, wherein the contextual data includes at least one of a textual communication and a file; and provide a dashboard that displays at least one of discussion threads, files, and people associated with a present level selected from a hierarchy of levels, wherein the hierarchy of levels includes a first level that corresponds to a set of organizations that the user belongs to, a second level that corresponds to a selected organization that the user belongs to, a third level that corresponds to a selected community within the selected organization, a fourth level that corresponds to a selected discussion thread within the selected community and any video conferences among users in the selected discussion thread, and a fifth level that corresponds to a specific video conference and its corresponding thread among users from one or more of the organizations.

* * * * *